(12) United States Patent
Wolf et al.

(10) Patent No.: US 11,427,057 B1
(45) Date of Patent: Aug. 30, 2022

(54) MOVABLE PANEL ASSEMBLIES

(71) Applicants: Philipp J. Wolf, Santa Clara, CA (US); John Raff, Menlo Park, CA (US); Donald R. Monroe, Los Gatos, CA (US); Samuel G. Fowle, San Francisco, CA (US); Antonio B. Martinez, Sunnyvale, CA (US); Albert J. Golko, Saratoga, CA (US); Ali Tavakoli Targhi, Sunnyvale, CA (US); David J. Donohue, San Francisco, CA (US); David E. Kingman, San Jose, CA (US); Ibuki Kamei, Santa Clara, CA (US); Christopher L. Porritt, Sunnyvale, CA (US)

(72) Inventors: Philipp J. Wolf, Santa Clara, CA (US); John Raff, Menlo Park, CA (US); Donald R. Monroe, Los Gatos, CA (US); Samuel G. Fowle, San Francisco, CA (US); Antonio B. Martinez, Sunnyvale, CA (US); Albert J. Golko, Saratoga, CA (US); Ali Tavakoli Targhi, Sunnyvale, CA (US); David J. Donohue, San Francisco, CA (US); David E. Kingman, San Jose, CA (US); Ibuki Kamei, Santa Clara, CA (US); Christopher L. Porritt, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/098,563

(22) Filed: Nov. 16, 2020

Related U.S. Application Data

(63) Continuation of application No. 16/352,967, filed on Mar. 14, 2019, now abandoned, which is a
(Continued)

(51) Int. Cl.
*B60J 7/02* (2006.01)
*B60J 7/043* (2006.01)
*B60J 7/057* (2006.01)

(52) U.S. Cl.
CPC ............... *B60J 7/02* (2013.01); *B60J 7/0435* (2013.01); *B60J 7/0573* (2013.01)

(58) Field of Classification Search
CPC ....... B60J 7/22; B60J 7/02; B60J 7/024; B60J 7/028; B60J 7/043; B60J 7/0435; B60J 7/047
(Continued)

(56) References Cited

U.S. PATENT DOCUMENTS

| | | | |
|---|---|---|---|
| 1,981,897 A | * 11/1934 | Bishop | ................... B60H 1/262 296/95.1 |
| 2,203,931 A | 6/1940 | Solomon et al. | |

(Continued)

FOREIGN PATENT DOCUMENTS

| | | |
|---|---|---|
| DE | 3635888 A1 | 5/1988 |
| DE | 19701211 C1 | 2/1998 |

(Continued)

*Primary Examiner* — Dennis H Pedder
(74) *Attorney, Agent, or Firm* — Young Basile Hanlon & MacFarlane, P.C.

(57) ABSTRACT

A vehicle includes a roof opening, a front window that is located forward from the roof opening, and a rear window that is located rearward from the roof opening. The vehicle also includes a first panel and a second panel. The first panel and the second panel obstruct the roof opening in a closed position and are movable to an open position in which the first panel is positioned adjacent to an exterior surface of the front window and the second panel is positioned adjacent to an exterior surface of the rear window.

22 Claims, 23 Drawing Sheets

Related U.S. Application Data continuation of application No. 15/655,333, filed on Jul. 20, 2017, now Pat. No. 10,239,390.

(60) Provisional application No. 62/375,496, filed on Aug. 16, 2016.

(58) Field of Classification Search
USPC .... 296/216.03, 216.05, 220.01, 216.08, 95.1
See application file for complete search history.

(56) References Cited

U.S. PATENT DOCUMENTS

| | | | |
|---|---|---|---|
| 2,208,712 A | | 7/1940 | Votypka |
| 2,651,541 A | | 9/1953 | Surles |
| 3,036,860 A | | 5/1962 | Geiger |
| 3,975,048 A | | 8/1976 | Matusek |
| 4,009,902 A | | 3/1977 | Yoxtheimer |
| 4,185,868 A | | 1/1980 | Kaltz et al. |
| 4,415,195 A | | 11/1983 | Furukawa et al. |
| 5,040,845 A | | 8/1991 | Huyer |
| 5,078,447 A | * | 1/1992 | Klein ............... B60J 7/028 |
| | | | 296/107.2 |
| 5,145,231 A | | 9/1992 | Gotomyo |
| 5,149,170 A | | 9/1992 | Matsubara et al. |
| 6,129,413 A | | 10/2000 | Klein |
| 6,276,742 B1 | | 8/2001 | Deng et al. |
| 6,419,308 B1 | | 7/2002 | Corder et al. |
| 6,669,201 B1 | | 12/2003 | Guillez et al. |
| 6,669,278 B2 | | 12/2003 | Patelczyk et al. |
| 6,874,846 B2 | | 4/2005 | Friedrich et al. |
| 7,229,126 B2 | | 6/2007 | Seifert |
| 7,441,833 B1 | | 10/2008 | Pomeroy et al. |
| 7,717,500 B2 | | 5/2010 | von Malmborg et al. |
| 8,714,617 B2 | | 5/2014 | Hipshier et al. |
| 9,248,725 B2 | * | 2/2016 | Comfort ............... B60J 7/04 |
| 9,296,281 B2 | | 3/2016 | Ricardo et al. |
| 2003/0011215 A1 | | 1/2003 | Arnold et al. |
| 2009/0072575 A1 | * | 3/2009 | Browne ............ B60J 11/025 |
| | | | 296/97.7 |

FOREIGN PATENT DOCUMENTS

| | | | |
|---|---|---|---|
| DE | 19729164 | * | 3/1998 |
| DE | 19851366 A1 | | 5/1999 |
| EP | 1331120 A1 | | 7/2003 |
| WO | 9626081 A1 | | 8/1996 |

* cited by examiner

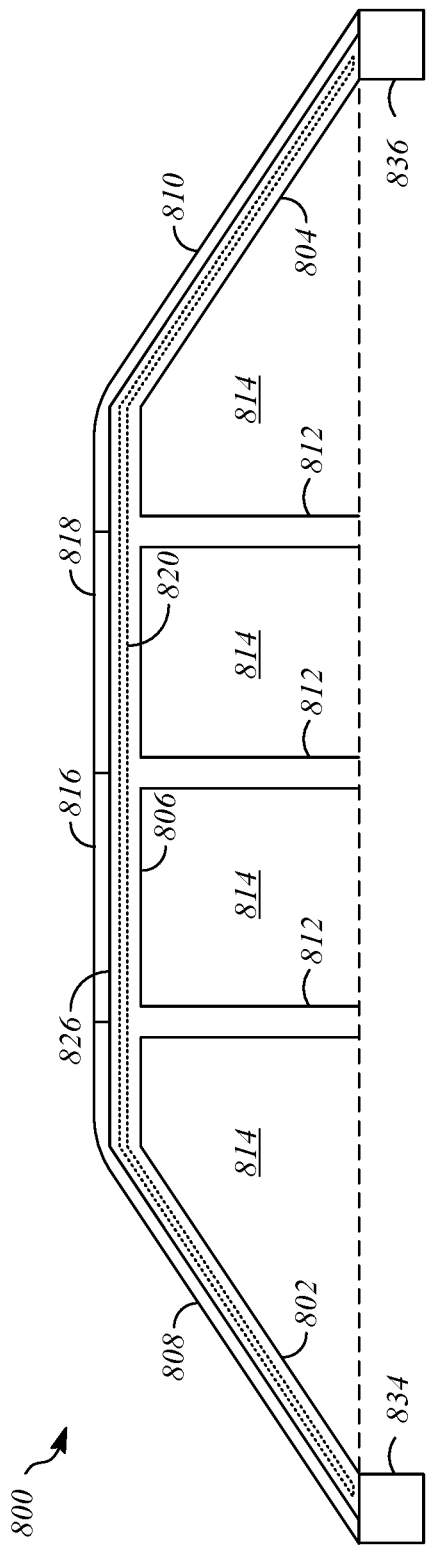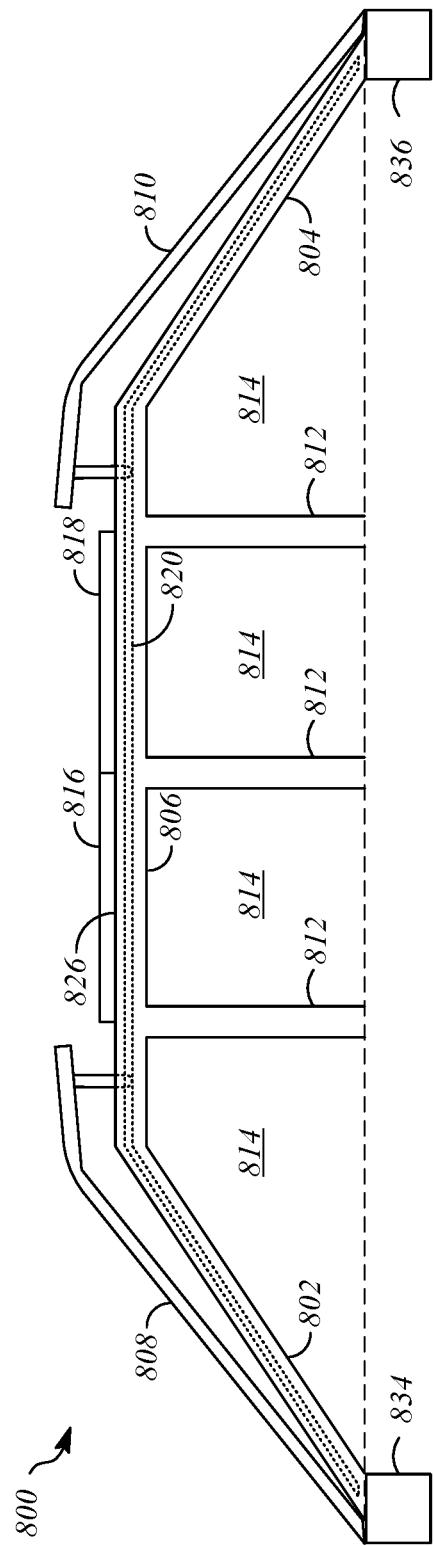
FIG. 8
FIG. 9

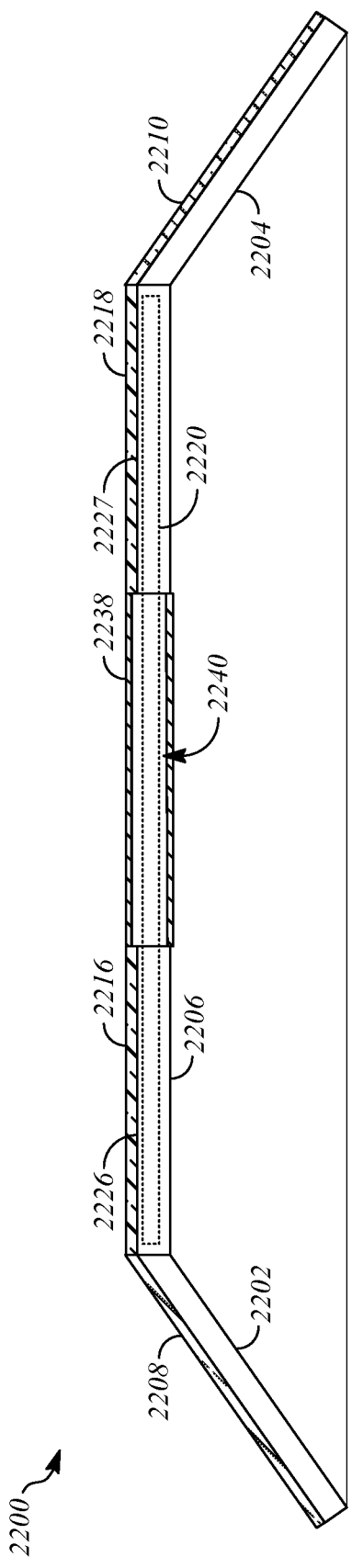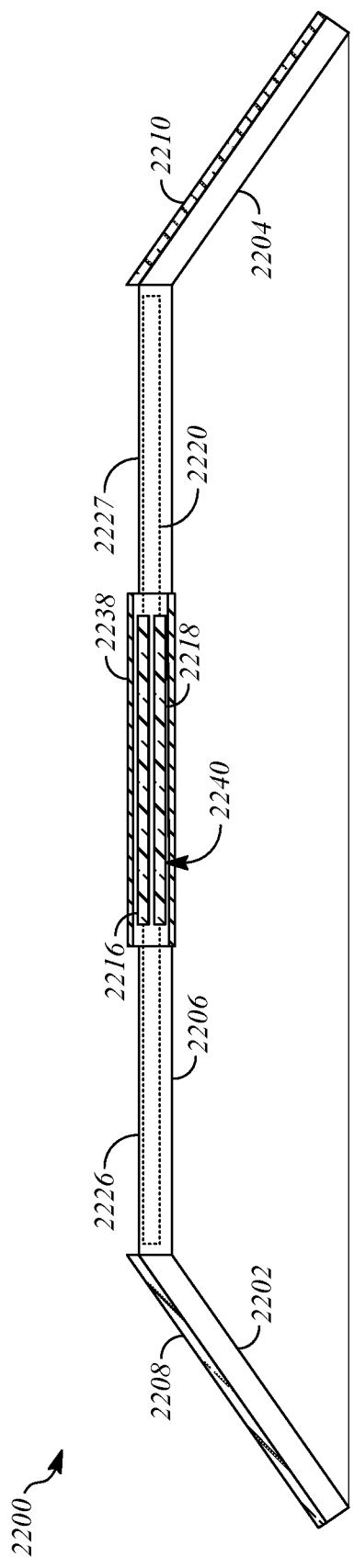
FIG. 22
FIG. 23

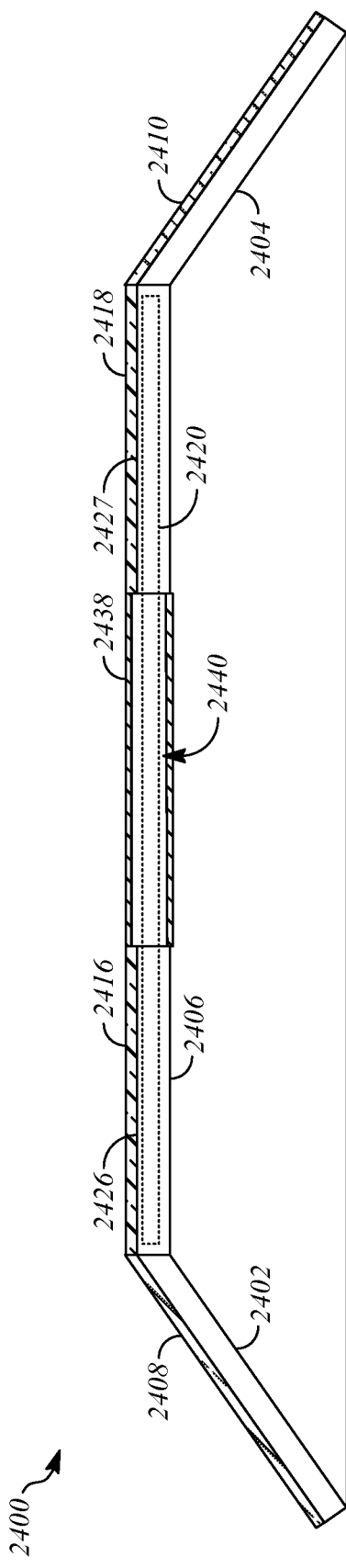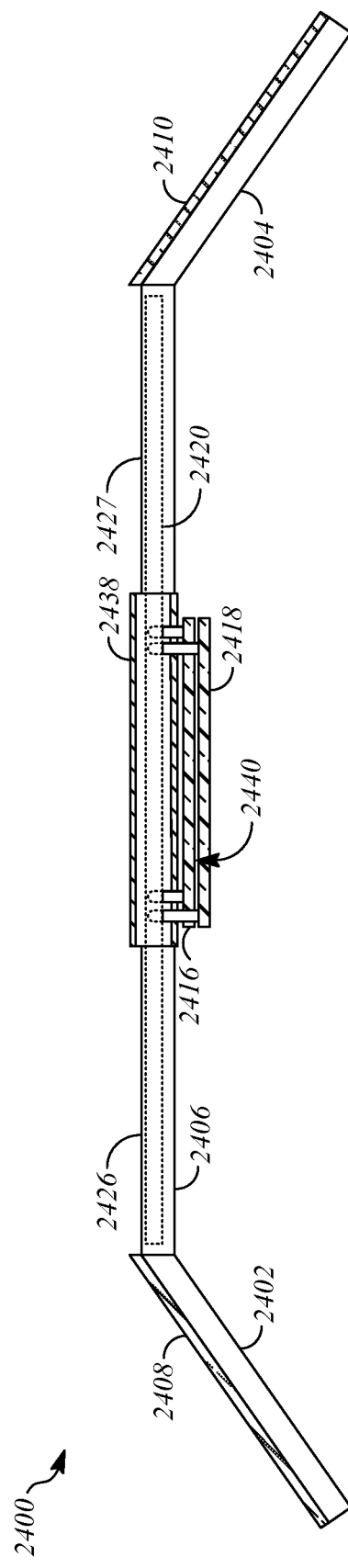

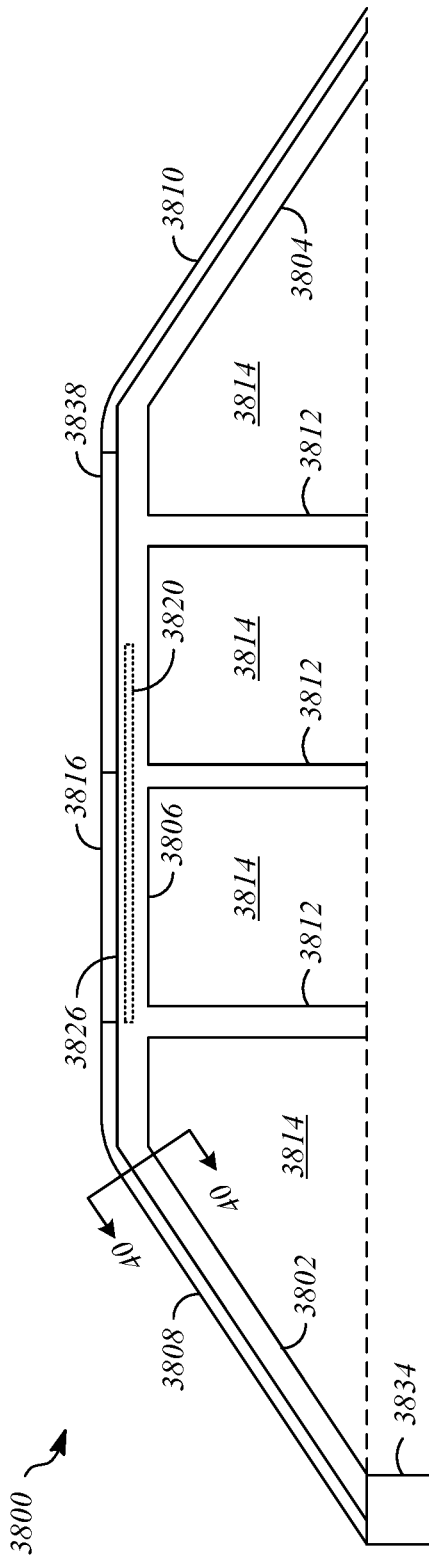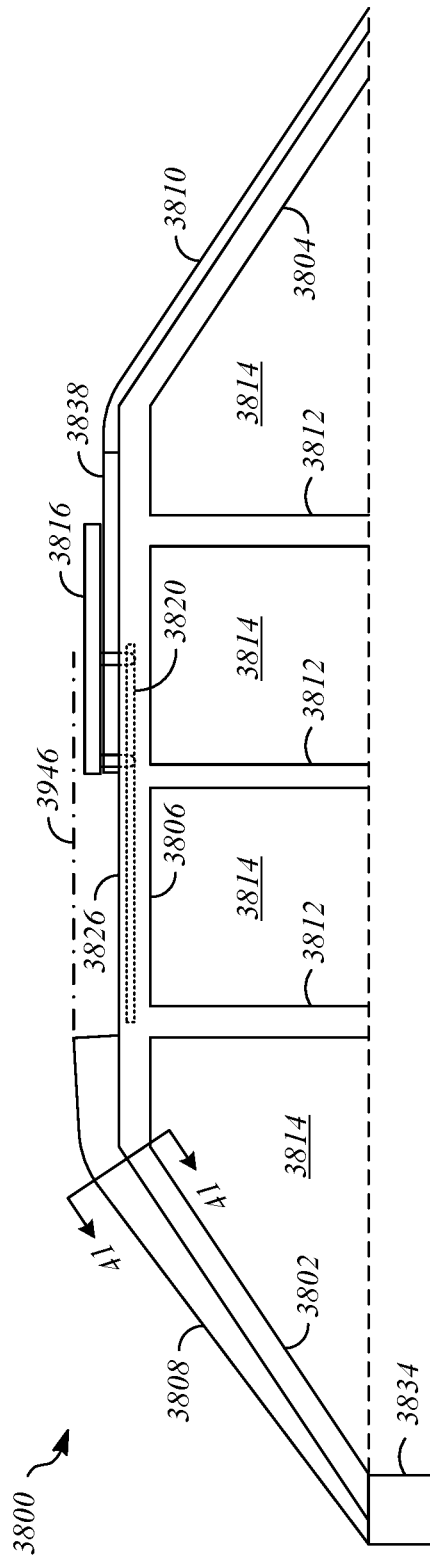

MOVABLE PANEL ASSEMBLIES

CROSS-REFERENCE TO RELATED APPLICATIONS

This application is a continuation of U.S. patent application Ser. No. 16/352,967, filed on Mar. 14, 2019, which is a continuation of U.S. patent application Ser. No. 15/655,333, filed on Jul. 20, 2017, which claims the benefit of U.S. Provisional Application No. 62/375,496, filed on Aug. 16, 2016, and entitled "Movable Panel Assemblies," the content of which is incorporated herein by reference in its entirety.

TECHNICAL FIELD

The application relates generally to movable panel assemblies for vehicle roofs.

BACKGROUND

Automobile windows function in part to admit light into the interior of a vehicle. Some automobile windows, such as windows incorporated in automobile doors, are movable to an open position to admit air into the interior of the vehicle. In order to admit additional light and air into the vehicle interior, some fixed-roof automobiles include a movable panel known as a sunroof. Sunroofs come in many styles, with the most popular styles incorporating a sliding mechanism that moves a sunroof panel rearward out of a sunroof opening, either to a compartment internal to the roof of the vehicle or to a position external to the roof of the vehicle.

SUMMARY

One aspect of the disclosed embodiments is a vehicle that includes an opening, a first panel, and a second panel. The first panel and the second panel obstruct the opening in a closed position and are movable to an open position in which at least part of the first panel is positioned forward of the opening and at least part of the second panel is positioned rearward of the opening. In some implementations, the vehicle also includes an exterior surface, and an engaging part that is formed on a lower surface of the first panel. The first panel and the second panel may each be positioned adjacent to the exterior surface in the open position. The engaging part may contact the exterior surface when the first panel is in the open position to restrict airflow between the engaging part and the exterior surface. The engaging part may be formed from a resilient material. At least part of the first panel may be at least translucent and at least part of the second panel may be at least translucent. In some implementations, the vehicle may include an extension assembly that supports the first panel and the second panel for sliding motion between the closed and open positions and an actuator for causing motion of the first panel and the second panel between the closed and open positions using the extension assembly.

Another aspect of the disclosed embodiments is a vehicle that includes an opening, a first panel, and a second panel. The first panel and the second panel obstruct the opening in a closed position and are movable to an open position in which at least part of the first panel is pivoted upward relative to the opening and at least part of the second panel is positioned rearward of the opening. In some implementations, the vehicle includes an exterior surface, wherein the second panel is positioned adjacent to the exterior surface in the open position. At least part of the first panel may be at least translucent and at least part of the second panel may be at least translucent. In some implementations, the vehicle may include an extension assembly that supports the first panel and the second panel for sliding motion between the closed and open positions and an actuator for causing motion of the first panel and the second panel between the closed and open positions using the extension assembly.

Another aspect of the disclosed embodiments is a vehicle that includes an opening, and a first panel. The vehicle also includes an exterior surface and an engaging part that is formed on a lower surface of the first panel. The first panel obstructs the opening in a closed position and is movable to an open position in which at least part of the first panel is positioned forward of the opening. The engaging part contacts the exterior surface when the first panel is in the open position to restrict airflow. The engaging part may be formed from a resilient material. At least part of the first panel may be at least translucent. The vehicle may further include an extension assembly that supports the first panel for sliding motion between the closed and open positions, and an actuator for causing motion of the first panel between the closed and open positions using the extension assembly.

Another aspect of the disclosed embodiments is a vehicle that includes an opening, a front window positioned forward of the opening, a rear window positioned rearward of the opening, a first panel, and a second panel. The first panel and the second panel obstruct the opening in a closed position and are movable to an open position. The front window and rear window move to raised positions during movement of the first panel and the second panel to the open position, the first panel moves to the open position by movement forward and downward into an interior space, and the second panel moves to the open position by movement rearward and downward into the interior space. At least part of the first panel may be at least translucent and at least part of the second panel may be at least translucent. In some implementations, the vehicle also includes a third panel that obstructs the opening in the closed position, wherein the third panel moves to the open position by movement forward and downward into the interior space, and a fourth panel that obstructs the opening in the closed position, wherein the fourth panel moves to the open position by movement rearward and downward into the interior space. In some implementations, the vehicle may also include an extension assembly that supports the first panel and the second panel for sliding motion between the closed and open positions, and an actuator for causing motion of the first panel and the second panel between the closed and open positions using the extension assembly.

Another aspect of the disclosed embodiments is a vehicle that includes a first opening, a front window positioned forward of the first opening, a second opening, a rear window positioned rearward of the second opening, and a roof structure positioned between the first opening and the second opening. The vehicle also includes a first panel and a second panel. The first panel obstructs the first opening in a closed position, and the second panel obstructs the second opening in the closed position. The first panel and the second panel are movable to an open position. The first panel is adjacent to the roof structure and does not obstruct the first opening in the open position, and the second panel is adjacent to the roof structure and does not obstruct the second opening in the open position. The first panel and the second panel may be located at the exterior of the vehicle in the open position. The first panel and the second panel may be located at the interior of the vehicle in the open position. The first panel and the second panel may be located in an internal space defined in the roof structure in the open position. The first panel and the second panel may be disposed in a stacked configuration in the open position.

Another aspect of the disclosed embodiments is a vehicle that includes a roof structure, a first opening positioned on a first lateral side of the roof structure, a second opening positioned on a second lateral side of the roof structure, a first panel, and a second panel. The first panel obstructs the first opening in a closed position, and the second panel obstructs the second opening in the closed position. The first panel and the second panel are movable to an open position. The first panel is adjacent to the roof structure and does not obstruct first the opening in the open position, and the second panel is adjacent to the roof structure and does not obstruct the second opening in the open position. The first panel and the second panel may be located at the exterior of the vehicle in the open position. The first panel and the second panel may be located at the interior of the vehicle in the open position. The first panel and the second panel are located in an internal space defined in the roof structure in the open position. The first panel and the second panel may be disposed in a stacked configuration in the open position.

Another aspect of the disclosed embodiments is a vehicle that includes a first side door, a second side door, a first opening, a second opening, a first panel, and a second panel. The first panel obstructs the first opening in a closed position, and the second panel obstructs the second opening in the closed position. The first panel and the second panel are movable to an open position. The first panel is disposed in an interior space of the first side door in an open position, and the second panel is disposed in an interior space of the second side door in the open position.

Another aspect of the disclosed embodiments is a vehicle that includes a roof structure, a first panel located forward of the roof structure, and a second panel located rearward of the roof structure. The first and second panels obstruct admission of air in a closed position. The first and second panels are movable to an open position in which the first panel is pivoted to define a front-facing opening to admit air into an interior of the vehicle, and the second panel is pivoted to define a rearward facing opening to allow venting of air from an interior of the vehicle.

Another aspect of the disclosed embodiments is a vehicle that includes an opening, a front window positioned forward of the opening, and a panel. The panel obstructs the opening in a closed position, the panel is movable to an open position in which the panel does not obstruct the opening, and the front window is raised in the open position to direct airflow over the opening in the open position.

BRIEF DESCRIPTION OF THE DRAWINGS

FIG. 8 is a side view of a fourth vehicle with a movable panel assembly in a closed position.
FIG. 9 is a side view of the fourth vehicle with the movable panel assembly in a first intermediate position.
FIG. 22 is a side cross-section view of an eighth vehicle with a movable panel assembly in a closed position.
FIG. 23 is a side cross-section view of the eighth vehicle with the movable panel assembly in an open position.
FIG. 24 is a side cross-section view of a ninth vehicle with a movable panel assembly in a closed position.
FIG. 25 is a side cross-section view of the ninth vehicle with the movable panel assembly in an open position.
FIG. 38 is a side view of a sixteenth vehicle with a movable panel assembly in a closed position.
FIG. 39 is a side view of the sixteenth vehicle with the movable panel assembly in an open position.

DETAILED DESCRIPTION

The following disclosure relates to movable panel assemblies that are used in automobile roofs, which may also be referred to as sunroofs.

Figure 1:
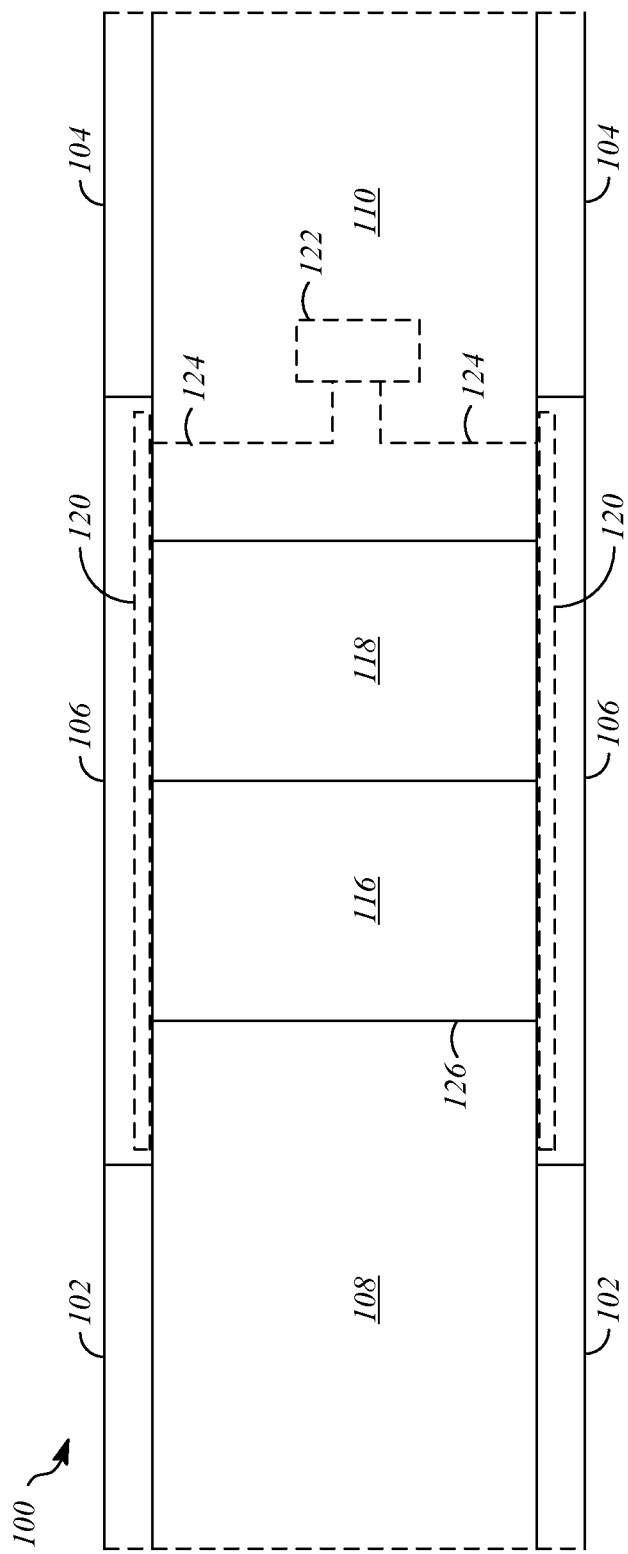
FIG. 1 is a top view of a first vehicle with a movable panel assembly in a closed position.

FIG. 1 is a top view showing a portion of a vehicle 100. The illustrated portion of the vehicle 100 is sometimes referred to as the greenhouse of the vehicle 100, and may include front pillars 102, rear pillars 104, and longitudinal rails 106 (e.g., cant rails). A front window 108 (i.e., a windshield) extends between the front pillars 102 in a transverse direction of the vehicle 100. A rear window 110 extends between the rear pillars 104 in the transverse direction of the vehicle 100.

Figure 2:
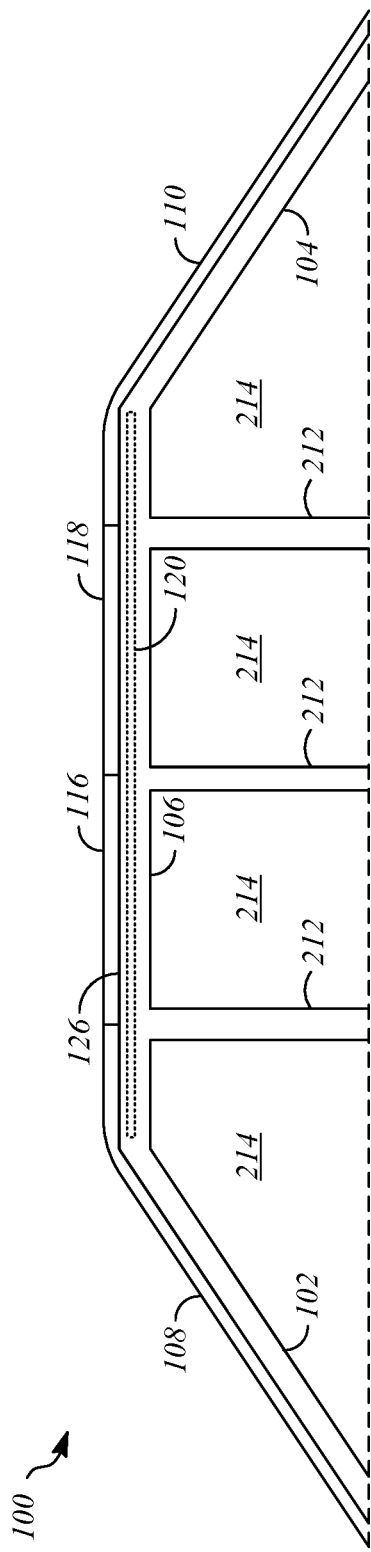
FIG. 2 is a side view of the first vehicle with the movable panel assembly in the closed position.

FIG. 2 is a side view showing the portion of the vehicle 100. The vehicle 100 may include intermediate pillars 212 that are generally upright and are connected to one or more of the front pillars 102, the rear pillars 104, or the longitudinal rails 106 at their top ends. Side windows 214 may be positioned at each transverse side of the vehicle 100 between pairs of pillars, such as between one of the front pillars 102 and one of the intermediate pillars 212, between pairs of the intermediate pillars 212, and between one of the intermediate pillars 212 and one of the rear pillars 104.

Figure 3:
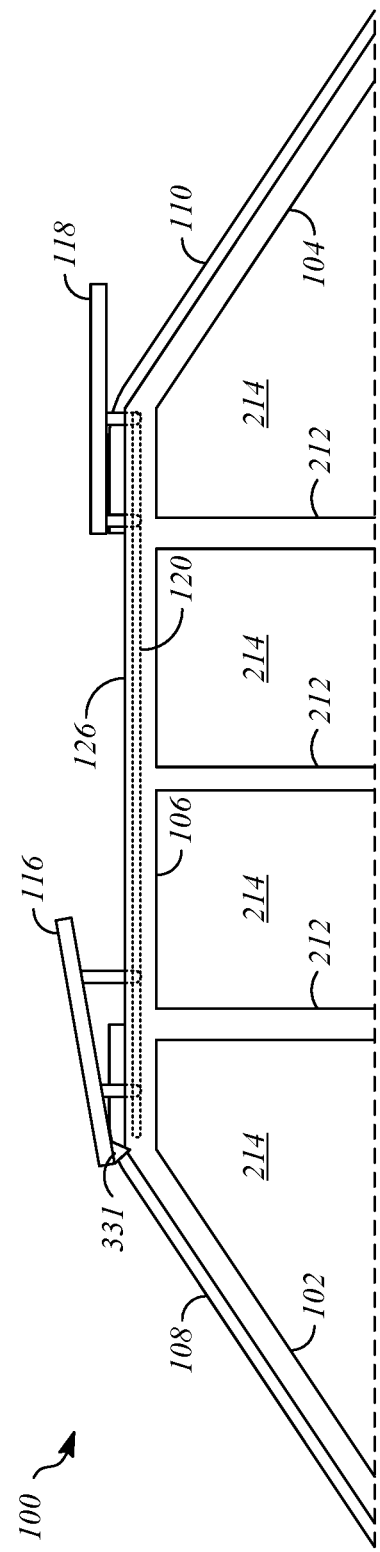
FIG. 3 is a side view of the first vehicle with the movable panel assembly in an open position.

As shown in FIGS. 1-3, the vehicle 100 has a movable panel assembly. The movable panel assembly includes one or more panels that are movable in the longitudinal direction between a closed position (FIGS. 1-2) and an open position (FIG. 3). In the illustrated example, the vehicle 100 includes a first panel 116 and a second panel 118. The first panel 116 is positioned longitudinally rearward from the front window 108. The first panel 116 may be directly adjacent to and/or abutting the front window 108 or may be longitudinally spaced from the front window 108 by an intermediate structure, such as a fixed roof portion or header (not shown) that extends between the longitudinal rails 106.

The second panel 118 may be positioned directly longitudinally rearward from the first panel 116, such that the first and second panels 116, 118 are adjacent and/or abutting. The second panel 118 is positioned longitudinally forward from the rear window 110. The second panel 118 may be directly adjacent to and/or abutting the rear window 110 or may be longitudinally spaced from the rear window 110 by an intermediate structure, such as a fixed roof portion or header (not shown) that extends between the longitudinal rails 106.

The first and second panels 116, 118 may be at least partly transparent or translucent to admit light into the interior of the vehicle 100. In some embodiments, the first and second panels 116, 118 are formed partially from transparent or translucent glass. In some embodiments, the first and second panels 116, 118 are formed partially from transparent or translucent plastic.

The vehicle 100 includes an extension assembly that supports the first and second panels 116, 118 for sliding motion between the closed and open positions. In the illustrated example, the vehicle 100 may include guide tracks 120 to allow motion of the first and second panels 116, 118. The guide tracks 120 are structures that permit constrained sliding and/or pivoting motion, primarily in the longitudinal direction of the vehicle 100. The first and second panels 116, 118 may each be connected to the guide tracks 120 by a respective connecting structure that includes appropriate fittings, arms, and/or linkages that allow movement, such as by sliding, of the first and second panels 116, 118 and also permit some vertical movement of the first and second panels 116, 118. In one embodiment, the connecting structures each include arms or beams that are connected to the respective one of the first and second panels 116, 118 for pivoting motion and are also connected to the guide tracks 120 for pivoting and sliding motion.

One or more actuators are connected to the first and second panels 116, 118 to cause motion of the first and second panels 116, 118 along the guide tracks 120. In the illustrated example, one or more electric motors 122 are connected to the first and second panels 116, 118 by cables 124. Extension and retraction of the cables 124 by the electric motors 122 causes motion of the first and second panels 116, 118 along the guide tracks 120.

The first panel 116 is supported with respect to the guide tracks 120 such that it is positioned within and obstructs an opening 126 when the first panel 116 is in the closed position. The opening 126 may be defined by or through a body of the vehicle 100, such as in a roof area of the body of the vehicle 100. Operation of the extension assembly may cause movement of the first panel 116 forward toward an open position of the first panel 116. In the open position of the first panel 116, at least part of the first panel 116 is positioned forward of the opening 126. Thus, a leading edge of the first panel 116 may be positioned closer to a longitudinal front end of the vehicle than a leading edge of the opening 126.

The second panel 118 is supported with respect to the guide tracks such that it is positioned within and obstructs the opening 126 in the closed position. Operation of the extension assembly may cause movement of the second panel 118 rearward toward an open position of the second panel 118. In the open position of the second panel 118, at least part of the second panel 118 is positioned rearward of the opening 126. Thus, a trailing edge of the second panel 118 may be positioned closer to a longitudinal rear end of the vehicle than a trailing edge of the opening 126. In some embodiments, the second panel 118 may be positioned entirely rearward of the opening 126.

The first panel 116 and the second panel 118 may move in concert between the closed and open positions. Thus, the first panel 116 and the second panel 118 obstruct the opening 126 in a closed position and are movable to an open position in which at least part of the first panel 116 is positioned forward of the opening 126 and at least part of the second panel 118 is positioned rearward of the opening 126.

In some embodiments, the first panel 116 is utilized to deflect wind upward and away from the opening 126 in order to reduce wind noise and buffeting that may occur when operating the vehicle with the first and second panels 116, 118 in the open position. While the first panel 116 is in the open position, the extension assembly inclines the first panel 116 by pivoting the leading edge of the panel downward and/or pivoting the trailing edge of the first panel 116 upward.

The first panel 116 may be configured to restrict airflow between the first panel 116 and an exterior surface of the vehicle 100, such as the front window 108, when the first panel 116 is in the open position. In some embodiments, an engaging part 331 is formed on a lower surface of the first panel 116, and is positioned such that the engaging part 331 contacts the front window 108 or other exterior surface of the vehicle 100 when the first panel 116 is in the open position. In some embodiments, the engaging part 331 is formed from a resilient material, such as a gasket material, in order to enhance engagement between the engaging part 331 and the exterior surface of the vehicle 100.

Figure 4:
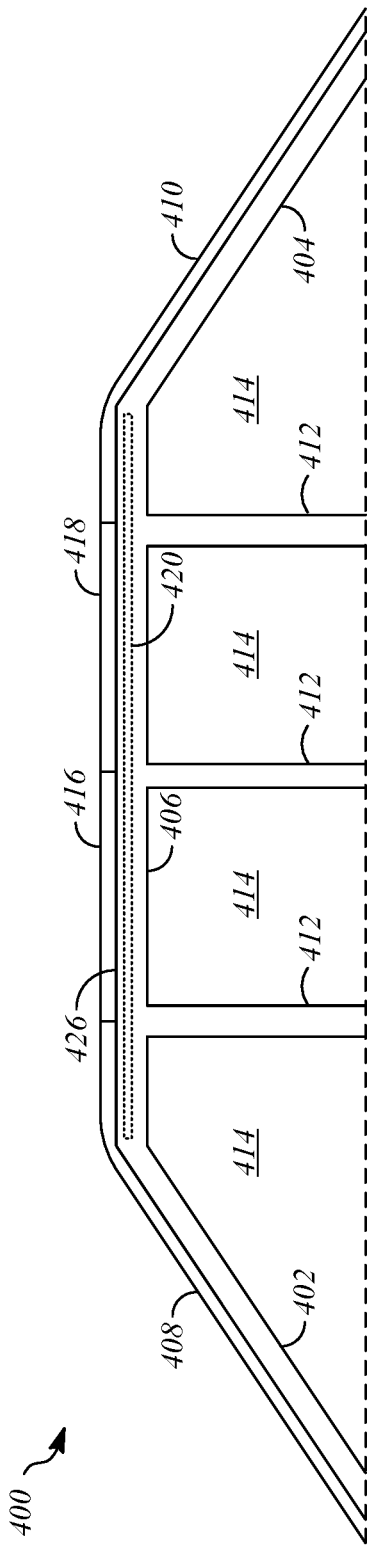
FIG. 4 is a side view of a second vehicle with a movable panel assembly in a closed position.
Figure 5:
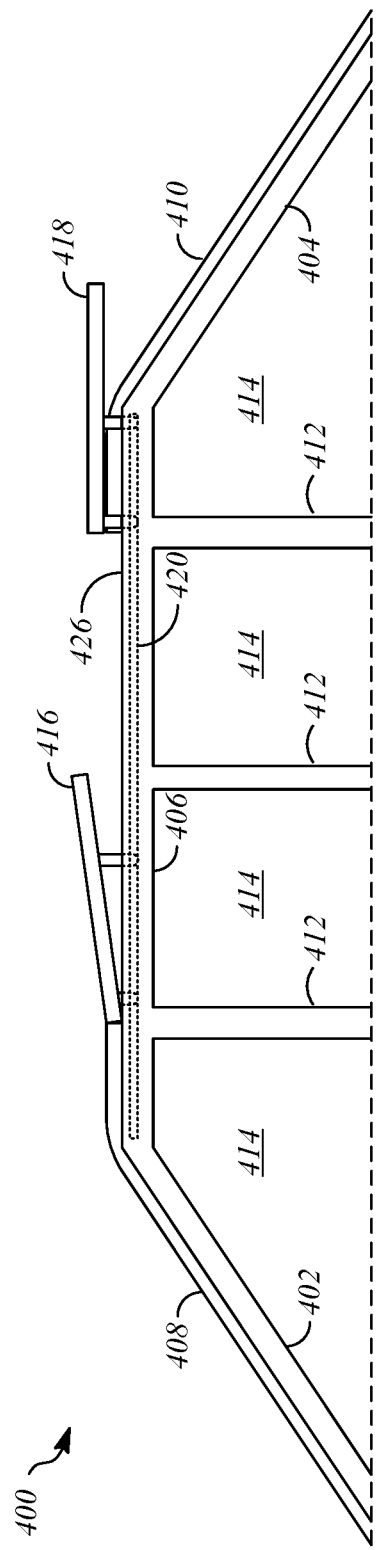
FIG. 5 is a side view of the second vehicle with the movable panel assembly in an open position.

FIGS. 4-5 show a portion of a vehicle 400. The vehicle 400 may include front pillars 402, rear pillars 404, longitudinal rails 406, a front window 408, a rear window 410, intermediate pillars 412, and side windows 414.

The vehicle 400 has a movable panel assembly that includes, for example, a first panel 416 and a second panel 418 that are movable between a closed position (FIG. 4) and an open position (FIG. 5).

The first panel 416 is positioned longitudinally rearward from the front window 408. The first panel 416 may be directly adjacent to and/or abutting the front window 408 or may be longitudinally spaced from the front window 408 by an intermediate structure, such as a fixed roof portion or header (not shown) that extends between the longitudinal rails 406. The second panel 418 may be positioned directly longitudinally rearward from the first panel 416, and longitudinally forward from the rear window 410. The first and second panels 416, 418 may be at least partly transparent or translucent to admit light into the interior of the vehicle 400, and may be formed, for example, at least partially from transparent or translucent glass or plastic.

The vehicle 400 includes an extension assembly for causing sliding motion of the first and second panels 416, 418 between the closed and open positions. The extension assembly may include, for example, guide tracks 420 and connecting structures. The vehicle 400 may include an actuator assembly (not shown in FIGS. 4-5), such as electric motors connected to the first and second panels 416, 418 by cables, as described with reference to FIG. 1.

The first panel 416 is supported with respect to the guide tracks 420 such that it is positioned within and fully obstructs an opening 426 when the first panel 416 is in the closed position. The opening 426 may be defined by or through a body of the vehicle 400, such as in a roof area of the body of the vehicle 400. Operation of the extension assembly may cause movement of the first panel 416 toward an open position of the first panel 416.

In the open position of the first panel 416, the trailing edge of the first panel 416 is raised relative to the closed position, such that the first panel 416 is inclined. The leading edge of the first panel 416 may remain at or near the position it is in when the first panel 416 is in the closed position. Thus, in some embodiments, the first panel 416 is not positioned forward of the opening 426, but, instead, the leading edge of the first panel 416 remains at the front edge of the opening 426 or is positioned within the opening 426. As a result of the position of the leading edge of the first panel 416 and the front-to-rear incline for the first panel 416, the first panel 416 directs wind over the portion of the opening 426 that is located rearward of the first panel 416. The opening 426 may remain partially obstructed by the opening 426 when the first panel 416 is in the open position.

The second panel 418 is supported with respect to the guide tracks 420 such that it is positioned within and obstructs the opening 426 in the closed position. Operation of the extension assembly may cause movement of the second panel 418 rearward toward an open position of the second panel 418. In the open position of the second panel 418, at least part of the second panel 418 is positioned rearward of the opening 426. Thus, a trailing edge of the second panel 418 may be positioned closer to a longitudinal rear end of the vehicle than a trailing edge of the opening 426. In some embodiments, the second panel 418 may be positioned entirely rearward of the opening 426.

The first panel 416 and the second panel 418 may move in concert between the closed and open positions. Thus, the first panel 416 and the second panel 418 obstruct the opening 426 in a closed position and are movable to an open position in which the first panel 416 is inclined upward relative to the opening and at least part of the second panel 118 is positioned rearward of the opening.

Figure 6:
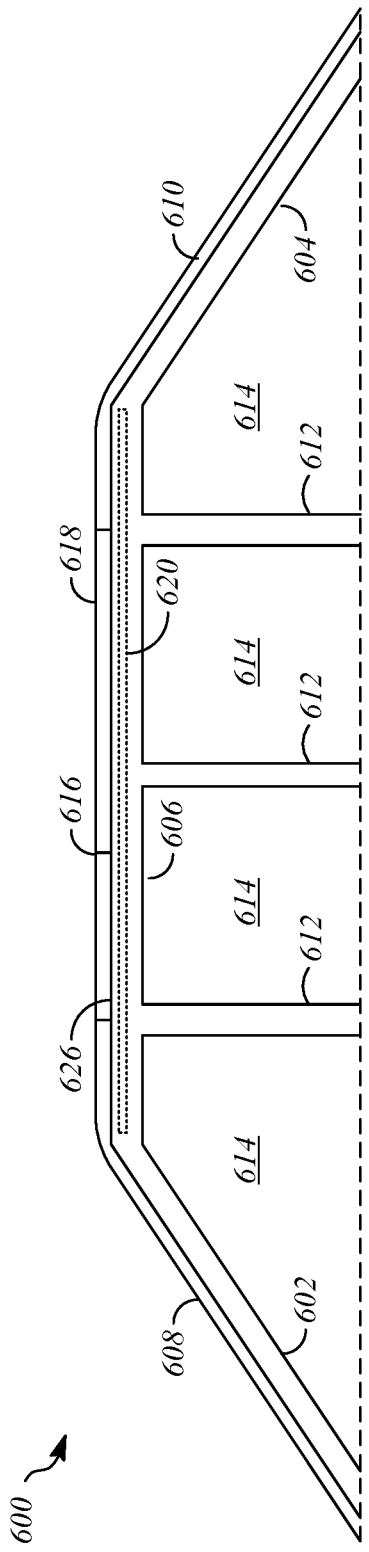
FIG. 6 is a side view of a third vehicle with a movable panel assembly in a closed position.
Figure 7:
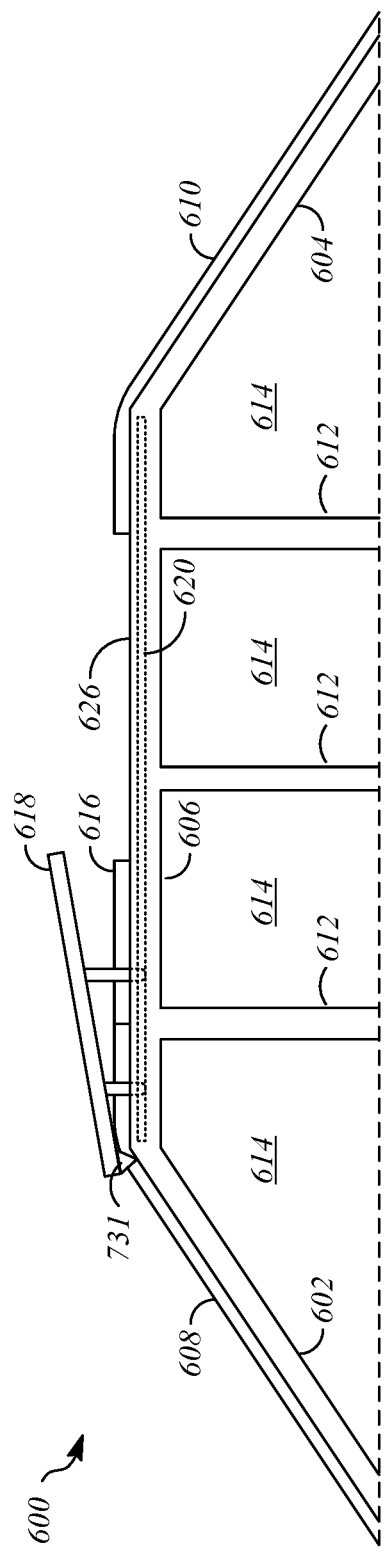
FIG. 7 is a side view of the third vehicle with the movable panel assembly in an open position.

FIGS. 6-7 show a portion of a vehicle 600. The vehicle 600 may include front pillars 602, rear pillars 604, longitudinal rails 606, a front window 608, a rear window 610, intermediate pillars 612, and side windows 614.

The vehicle 600 has a movable panel assembly that includes, for example, a first panel 616 and a second panel 618. The first panel 616 may be fixed or may be movable. The second panel 618 is movable between a closed position (FIG. 6) and an open position (FIG. 7).

The first panel 616 is positioned longitudinally rearward from the front window 608. The first panel 616 may be directly adjacent to and/or abutting the front window 608 or may be longitudinally spaced from the front window 608 by an intermediate structure, such as a fixed roof portion or header (not shown) that extends between the longitudinal rails 606. The second panel 618 may be positioned directly longitudinally rearward from the first panel 616, and longitudinally forward from the rear window 610. The first and second panels 616,618 may be at least partly transparent or translucent to admit light into the interior of the vehicle 600, and may be formed, for example, at least partially from transparent or translucent glass or plastic.

The vehicle 600 includes an extension assembly. The extension assembly is configured to cause sliding motion of the second panel 618 between the closed and open positions, and may optionally be able to cause motion of the first panel 616. The extension assembly may include, for example, guide tracks 620 and connecting structures. The vehicle 600 may include an actuator assembly (not shown in FIGS. 6-7), such as electric motors connected to the second panel 618 and optionally to the first panel 616 by cables, as described with reference to FIG. 1.

The second panel 618 is supported with respect to the guide tracks 620 such that it is positioned within and obstructs the opening 626 in the closed position. Operation of the extension assembly may cause movement of the second panel 618 forward toward an open position of the second panel 618. In the open position of the second panel 618, at least part of the second panel 618 is positioned forward of the opening 626. Thus, a leading edge of the second panel 618 may be positioned closer to a longitudinal front end of the vehicle than a leading edge of the opening 626. The second panel 618 may be positioned above the first panel 616. The second panel may be inclined front-to-rear relative to the opening 626 and the first panel 616.

In some embodiments, the second panel 618 is utilized to deflect wind upward and away from the opening 626 in order to reduce wind noise and buffeting that may occur when operating the vehicle with the second panel 618 in the open position. While the second panel 618 is in the open position, the extension assembly inclines the second panel 618, by pivoting the leading edge of the panel downward and/or pivoting the trailing edge of the second panel 618 upward.

The second panel 618 may be configured to restrict airflow between the second panel 618 and an exterior surface of the vehicle 600, such as the front window 608, when the second panel 618 is in the open position. In some embodiments, an engaging part 731 is formed on a lower surface of the second panel 618, and is positioned such that the engaging part 731 contacts the front window 608 or other exterior surface of the vehicle 600 when the second panel 618 is in the open position. In some embodiments, the engaging part 731 is formed from a resilient material, such as a gasket material, in order to enhance engagement between the engaging part 731 and the exterior surface of the vehicle 600.

Figure 12:
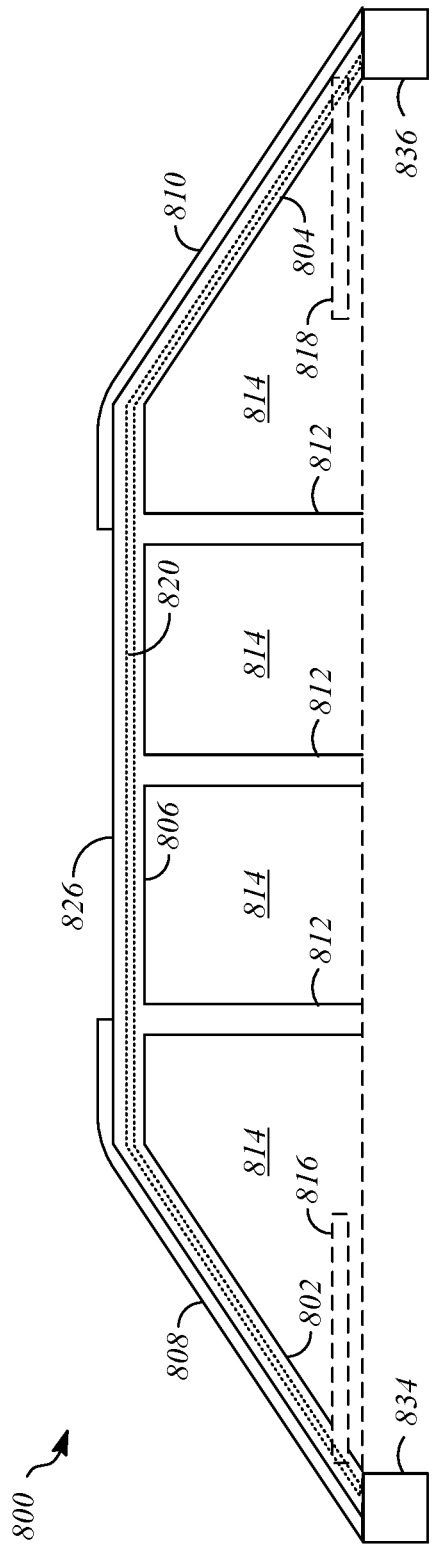
FIG. 12 is a side view of the fourth vehicle with the movable panel assembly in an open position.

FIG. 8 is a side view that shows a portion of a vehicle 800 with a movable panel assembly in a closed position. The vehicle 800 may include front pillars 802, rear pillars 804, longitudinal rails 806, a front window 808, a rear window 810, intermediate pillars 812, and side windows 814. The movable panel assembly includes, for example, a first panel 816 and a second panel 818 that are movable between a closed position (FIG. 8) and an open position (FIG. 12).

The first panel 816 is positioned longitudinally rearward from the front window 808. The first panel 816 may be directly adjacent to and/or abutting the front window 808 or may be longitudinally spaced from the front window 808 by an intermediate structure, such as a fixed roof portion or header (not shown) that extends between the longitudinal rails 806. The second panel 818 may be positioned directly longitudinally rearward from the first panel 816, and longitudinally forward from the rear window 810. The first and second panels 816, 818 are positioned within and fully obstruct an opening 826 in the closed position. The first and second panels 816, 818 may be at least partly transparent or translucent to admit light into the interior of the vehicle 800, and may be formed, for example, at least partially from transparent or translucent glass or plastic.

The vehicle 800 includes an extension assembly for causing motion of the first and second panels 816, 818 between the closed and open positions. The extension assembly may include, for example, guide tracks 820. The extension assembly may also include structures that connect the first and second panels 816, 818 to the guide tracks 820, such as linkages and associated hardware. In some embodiments, the first and second panels 816, 818 are connected to the guide tracks 820 by four-bar linkages. To move the first and second panels 816, 818 with respect to the tracks, the vehicle 800 may include an actuator assembly (not shown in FIGS. 8-12), such as electric motors connected to the first and second panels 816, 818 by cables, as described with reference to FIG. 1.

The vehicle 800 includes a front window motion mechanism 834 and a rear window motion mechanism 836. The front window motion mechanism 834 is connected to the front window 808 and is operable to move the front window 808, such as by translation upward, translation forward, translation upward and forward, or by pivoting the front window 808. As an example, the center of rotation of the pivot may be at a base of the front window 808, such as at or near a lowest point of the front window 808. The front window motion mechanism 834 may include suitable components for supporting the front window 808, such as hinges or linkages (for example, one or more four-bar linkages). The rear window motion mechanism 836 is connected to the rear window 810 and is operable to move the rear window 810, such as by translation upward, translation forward, translation upward and forward, or by pivoting the rear window 810. As an example, the center of rotation of the pivot may be at a base of the rear window 810, such as at or near a lowest point of the rear window 810. The rear window motion mechanism 836 may include suitable components for supporting the rear window 810, such as hinges or linkages (for example, one or more four-bar linkages).

FIG. 9 is a side view of the vehicle 800 with the movable panel assembly in a first intermediate position. In the first intermediate position, the front window motion mechanism 834 has moved the front window 808 upward relative to the front pillars 802, such as by pivoting, and the rear window motion mechanism 836 has moved the rear window 810, such as by pivoting, upward relative to the rear pillars 804. Movement of the front window 808 and the rear window 810 to the first intermediate position is made in preparation of movement of the first and second panels 816, 818. In the illustrated example, the first and second panels 816, 818 have not moved in the first intermediate position relative to the closed position.

Figure 10:
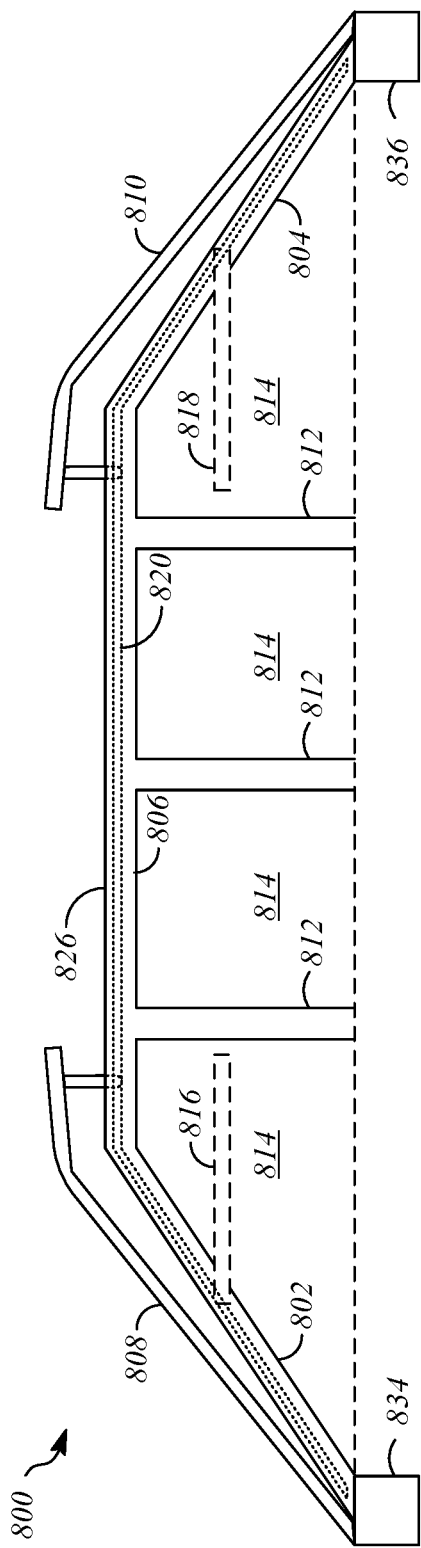
FIG. 10 is a side view of the fourth vehicle with the movable panel assembly in a second intermediate position.

Movement from the closed position toward the open position continues as shown in FIG. 10, which is a side view of the vehicle 800 with the movable panel assembly in a second intermediate position. The front window 808 and the rear window 810 have not moved relative to the first intermediate position. The first panel 816 has moved forward on the guide tracks 820, downward along the front pillars 802 toward the front of the vehicle 800. The second panel 818 has moved rearward on the guide tracks 820, downward along the rear pillars 804 toward the rear of the vehicle 800. In some embodiments, the angular orientations of the first and second panels 816, 818 do not change during movement between the closed position and the open position, as in the illustrated example. For instance, the first and second panels 816, 818 may be substantially horizontal. In other embodiments, the first and second panels 816, 818 may pivot during movement from the closed position toward the open position, such as to angles that match the angles of the front and rear pillars 802, 804, or to angles that match the angles of the front and rear windows 808, 810.

Figure 11:
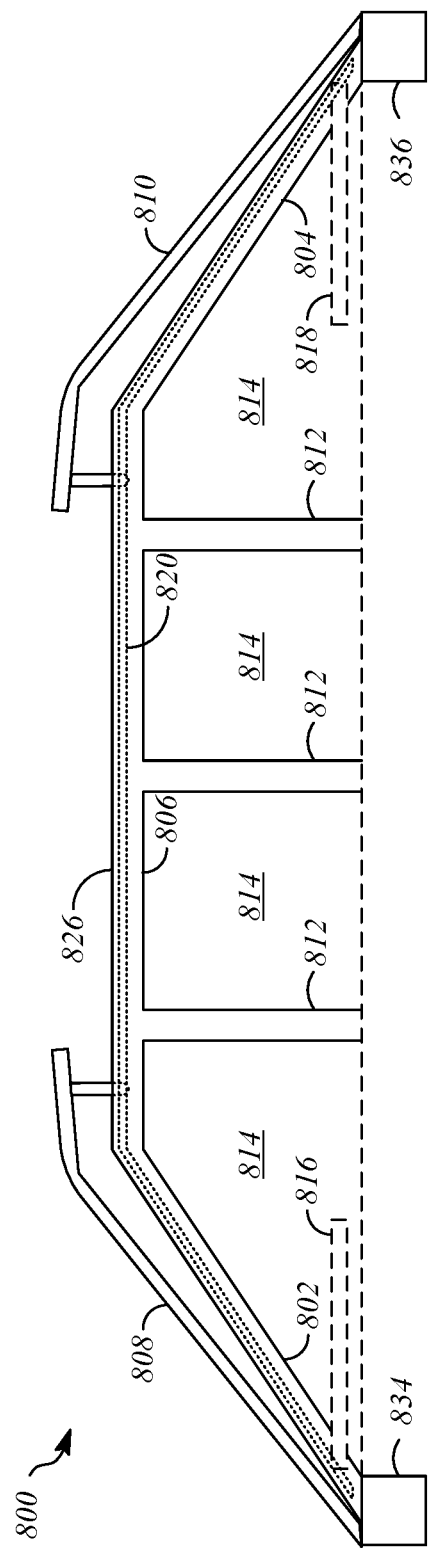
FIG. 11 is a side view of the fourth vehicle with the movable panel assembly in a third intermediate position.

Movement from the closed position toward the open position continues as shown in FIG. 11, which is a side view of the vehicle 800 with the movable panel assembly in a third intermediate position. In the third intermediate position, the first and second panels 816, 818 have reached final positions, such as near the bottoms of the front and rear pillars 802, 804, respectively, and/or near the bottoms of the front and rear windows 808, 810, respectively. In the third intermediate position, the front and rear windows 808, 810 remain raised, as in the first and second intermediate positions.

Movement from the closed position toward the open position is completed, as shown in FIG. 12, which is a side view of the vehicle 800 with the movable panel assembly in the open position. During movement from the third intermediate position to the open position, the front and rear windows 808, 810 are lowered to their original positions, as in the closed position of FIG. 8. The first and second panels 816, 818 may be oriented such that they are substantially horizontal, or may be pivoted by rotation toward the front and rear windows 808, 810. In some embodiments, the first panel 816 is rotated such that it is closely adjacent to the front window 808, and the second panel 818 is rotated such that it is closely adjacent to the rear window 810. Thus, the first panel 816 and the second panel 818 may be stored within the interior of the vehicle 800 when the movable panel assembly of the vehicle 800 is in the open position.

Figure 13:
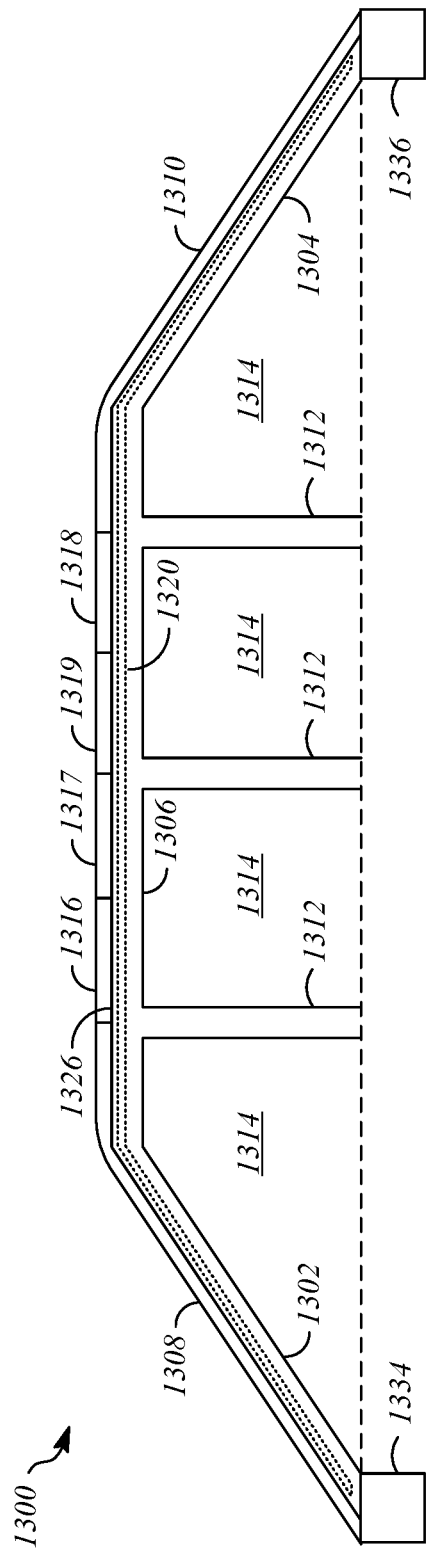
FIG. 13 is a side view of a fifth vehicle with a movable panel assembly in a closed position.

FIG. 13 is a side view that shows a portion of a vehicle 1300 with a movable panel assembly in a closed position.

Figure 17:
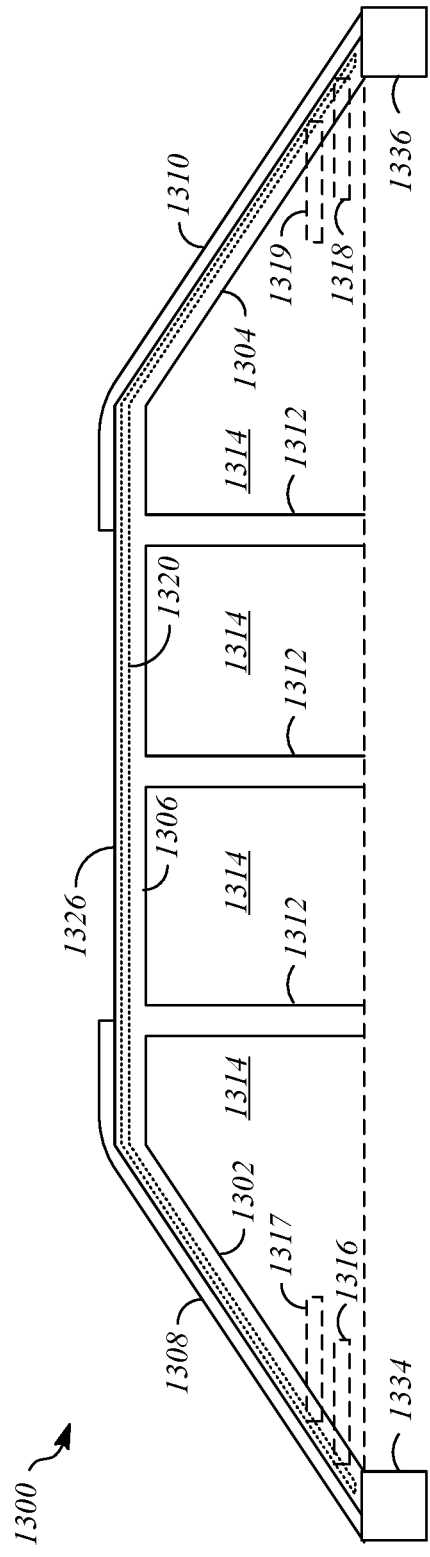
FIG. 17 is a side view of the fifth vehicle with the movable panel assembly in an open position.

The vehicle 1300 may include front pillars 1302, rear pillars 1304, longitudinal rails 1306, a front window 1308, a rear window 1310, intermediate pillars 1312, and side windows 1314. The movable panel assembly includes, for example, a first panel 1316, a second panel 1317, a third panel 1318, and a fourth panel 1319 that are movable between a closed position (FIG. 13) and an open position (FIG. 17).

The first panel 1316 is positioned longitudinally rearward from the front window 1308. The first panel 1316 may be directly adjacent to and/or abutting the front window 1308 or may be longitudinally spaced from the front window 1308 by an intermediate structure, such as a fixed roof portion or header (not shown) that extends between the longitudinal rails 1306. The second panel 1317 may be positioned longitudinally rearward from the first panel 1316, and the first and second panels 1316, 1317 may be adjacent and abutting in the closed position. The third panel 1318 may be positioned directly longitudinally forward from the rear window 1310. The fourth panel 1319 may be longitudinally forward from the third panel 1318 and longitudinally rearward from the second panel 1317 in the closed position. The first and second panels 1316, 1317 are positioned within and fully obstruct an opening 1326 in the closed position. The first, second, third, and fourth panels 1316, 1317, 1318, 1319 may be at least partly transparent or translucent to admit light into the interior of the vehicle 1300, and may be formed, for example, at least partially from transparent or translucent glass or plastic.

The vehicle 1300 includes an extension assembly for causing motion of the first, second, third, and fourth panels 1316, 1317, 1318, 1319 between the closed and open positions. The extension assembly may include, for example, guide tracks 1320. The extension assembly may also include structures that connect the first, second, third, and fourth panels 1316, 1317, 1318, 1319 to the guide tracks 1320, such as linkages and associated hardware. In some embodiments, the first, second, third, and fourth panels 1316, 1317, 1318, 1319 are connected to the guide tracks 1320 by four-bar linkages. To move the first, second, third, and fourth panels 1316, 1317, 1318, 1319 with respect to the tracks, the vehicle 1300 may include an actuator assembly (not shown in FIGS. 13-17), such as electric motors connected to the first, second, third, and fourth panels 1316, 1317, 1318, 1319 by cables, as described with reference to FIG. 1.

The vehicle 1300 includes a front window motion mechanism 1334 and a rear window motion mechanism 1336. The front window motion mechanism 1334 is connected to the front window 1308 and is operable to move the front window 1308, such as by translation upward, translation forward, translation upward and forward, or by pivoting the front window 1308. As an example, the center of rotation of the pivot may be at a base of the front window 1308, such as at or near a lowest point of the front window 1308. The front window motion mechanism 1334 may include suitable components for supporting the front window 1308, such as hinges or linkages (for example, one or more four-bar linkages). The rear window motion mechanism 1336 is connected to the rear window 1310 and is operable to move the rear window 1310, such as by translation upward, translation forward, translation upward and forward, or by pivoting the rear window 1310. As an example, the center of rotation of the pivot may be at a base of the rear window 1310, such as at or near a lowest point of the rear window 1310. The rear window motion mechanism 1336 may include suitable components for supporting the rear window 1310, such as hinges or linkages (for example, one or more four-bar linkages).

Figure 14:
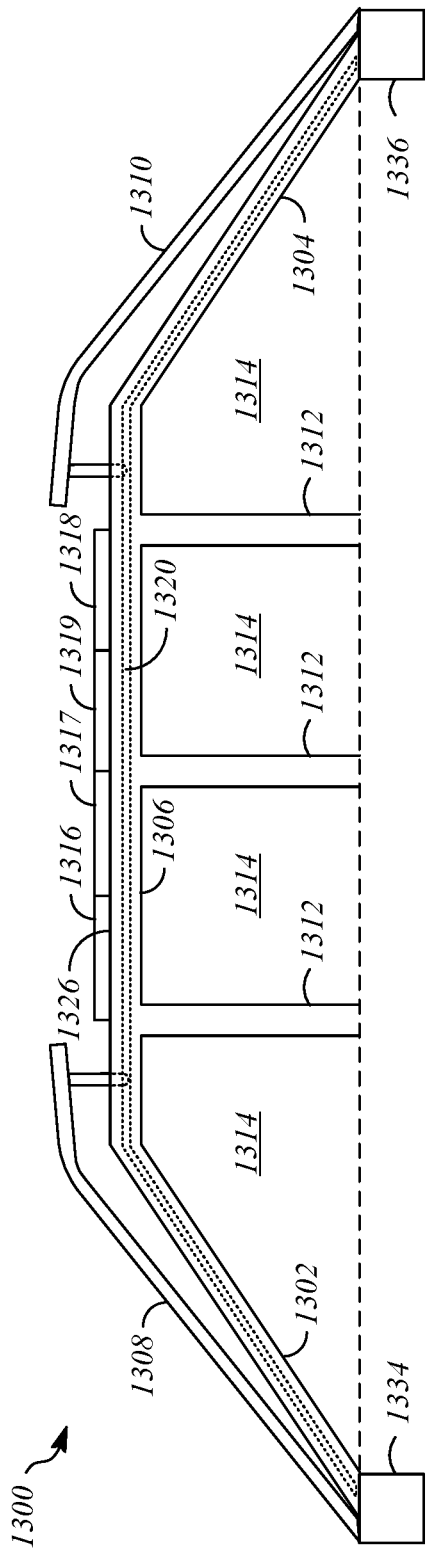
FIG. 14 is a side view of the fifth vehicle with the movable panel assembly in a first intermediate position.

FIG. 14 is a side view of the vehicle 1300 with the movable panel assembly in a first intermediate position. In the first intermediate position, the front window motion mechanism 1334 has moved the front window 1308 upward relative to the front pillars 1302, such as by pivoting, and the rear window motion mechanism 1336 has moved the rear window 1310, such as by pivoting, upward relative to the rear pillars 1304. Movement of the front window 1308 and the rear window 1310 to the first intermediate position is made in preparation of movement of the first, second, third, and fourth panels 1316, 1317, 1318, 1319. In the illustrated example, the first, second, third, and fourth panels 1316, 1317, 1318, 1319 have not moved in the first intermediate position relative to the closed position.

Figure 15:
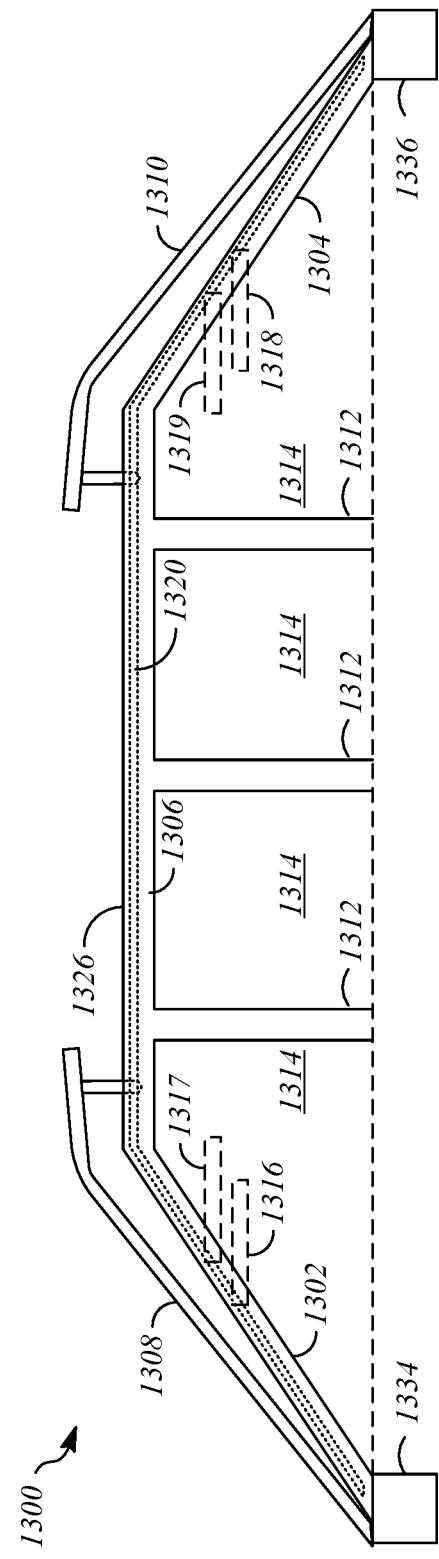
FIG. 15 is a side view of the fifth vehicle with the movable panel assembly in a second intermediate position.

Movement from the closed position toward the open position continues as shown in FIG. 15, which is a side view of the vehicle 1300 with the movable panel assembly in a second intermediate position. The front window 1308 and the rear window 1310 have not moved relative to the first intermediate position. The first and second panels 1316, 1317 have moved forward on the guide tracks 1320, downward along the front pillars 1302 toward the front of the vehicle 1300. The third and fourth panels 1318, 1319 have moved rearward on the guide tracks 1320, downward along the rear pillars 1304 toward the rear of the vehicle 1300. The angular orientations of the first, second, third, and fourth panels 1316, 1317, 1318, 1319 may be, as examples, horizontal, pivoted to angles that match the angles of the front and rear pillars 1302, 1304, or pivoted to angles that match the angles of the front and rear windows 1308, 1310.

Figure 16:
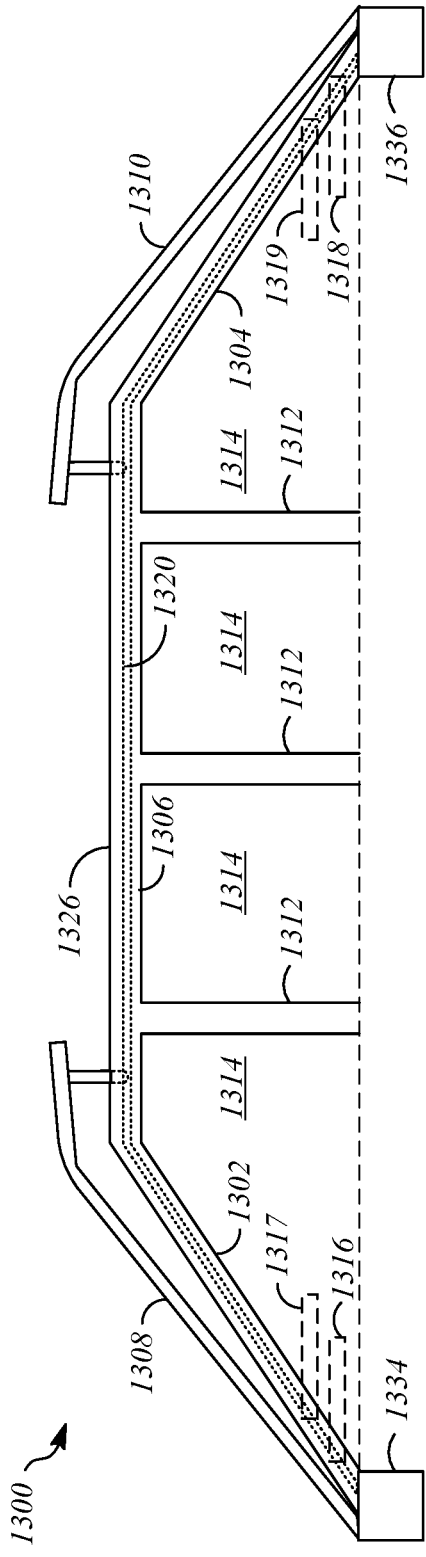
FIG. 16 is a side view of the fifth vehicle with the movable panel assembly in a third intermediate position.

Movement from the closed position toward the open position continues as shown in FIG. 16, which is a side view of the vehicle 1300 with the movable panel assembly in a third intermediate position. In the third intermediate position, the first, second, third, and fourth panels 1316, 1317, 1318, 1319 have reached final positions, such as near the bottoms of the front and rear pillars 1302, 1304, respectively, and/or near the bottoms of the front and rear windows 1308, 1310, respectively. In the third intermediate position, the front and rear windows 1308, 1310 remain raised, as in the first and second intermediate positions.

Figure 18:
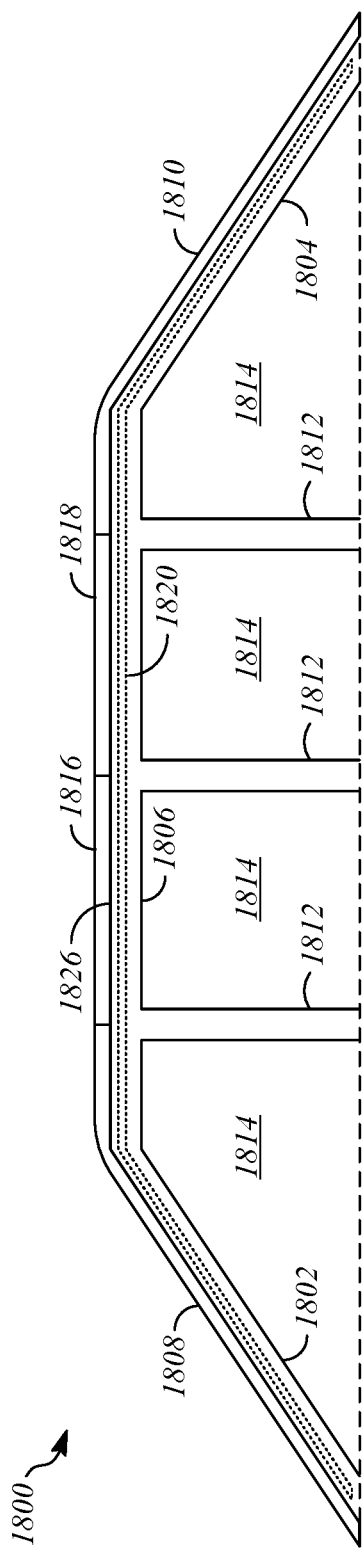
FIG. 18 is a side view of a sixth vehicle with a movable panel assembly in a closed position.
Figure 19:
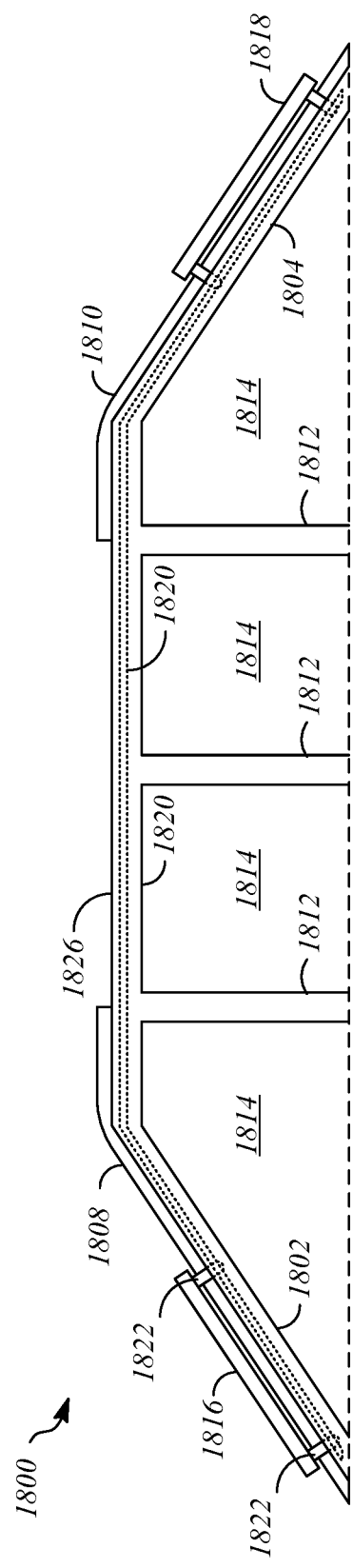
FIG. 19 is a side view of the sixth vehicle with the movable panel assembly in an open position.

Movement from the closed position toward the open position is completed, as shown in FIG. 17, which is a side view of the vehicle 1300 with the movable panel assembly in the open position. During movement from the third intermediate position to the open position, the front and rear windows 1308, 1310 are lowered to their original positions, as in the closed position of FIG. 13. The first, second, third, and fourth panels 1316, 1317, 1318, 1319 may be oriented such that they are substantially horizontal, or may be pivoted by rotation toward the front and rear windows 1308, 1310. In some embodiments, the first and second panels 1316, 1317 are rotated to be closely adjacent to the front window 1308, and the third and fourth panels 1318, 1319 are rotated to be closely adjacent to the rear window 1310. To reduce the amount of space required for storage of portions of the movable panel assembly in the open position, the first and second panels 1316, 1317 may be stored in a stacked configuration with respect to one another in the closed position, and the third and fourth panels 1318, 1319 may also be stored in a stacked configuration with respect to one another in the closed position. Thus, first, second, third, and fourth panels 1316, 1317, 1318, 1319 may be stored within the interior of the vehicle 1300 when the movable panel assembly of the vehicle 1300 is in the open position, FIG. 18 is a side view that shows a portion of a vehicle 1800 with a movable panel assembly in a closed position. The vehicle 1800 may include front pillars 1802, rear pillars 1804, longitudinal rails 1806, a front window 1808, a rear window 1810, intermediate pillars 1812, and side windows 1814. The movable panel assembly includes, for example, a first panel 1816 and a second panel 1818 that are movable between a closed position (FIG. 18) and an open position (FIG. 19).

The first panel 1816 is positioned longitudinally rearward from the front window 1808, and the second panel 1818 is positioned longitudinally rearward from the first panel 1816 and longitudinally forward from the rear window 1810. The first and second panels 1816, 1818 may be at least partly transparent or translucent to admit light into the interior of the vehicle 1800, and may be formed, for example, at least partially from transparent or translucent glass or plastic.

The vehicle 1800 includes an extension assembly for causing motion of the first and second panels 1816, 1818 between the closed and open positions. The extension assembly may include, for example, guide tracks 1820. The extension assembly may also include structures that connect the first and second panels 1816, 1818 to the guide tracks 1820, such as linkages 1822 and associated hardware. In some embodiments, the first and second panels 1816, 1818 are connected to the guide tracks 1820 by four-bar linkages. To move the first and second panels 1816, 1818 with respect to the tracks, the vehicle 1800 may include an actuator assembly (not shown in FIGS. 18-19), such as electric motors connected to the first and second panels 1816, 1818 by cables, as described with reference to FIG. 1.

The first panel 1816 and the second panel 1818 are supported with respect to the guide tracks 1820 such that they are positioned within and obstruct an opening 1826 when the first panel 1816 and the second panel 1818 are in the closed position. The opening 1826 may be defined by or through a body of the vehicle 1800, such as in a roof area of the body of the vehicle 1800.

The first and second panels 1816, 1818 are connected to the guide tracks 1820 such that they move along the exterior of the vehicle between the closed position and the open position, as shown in FIG. 19, which is a side view that shows a portion of the vehicle 1800 with the movable panel assembly in the open position. The first panel 1816 is positioned adjacent to an exterior surface of the front window 1808 in the open position, and the second panel 1818 is positioned adjacent to an exterior surface of the rear window 1810 in the open position. The first and second panels may be positioned near the lower ends of the front and rear pillars 1802, 1804, and/or the front and rear windows 1808, 1810, respectively.

Figure 20:
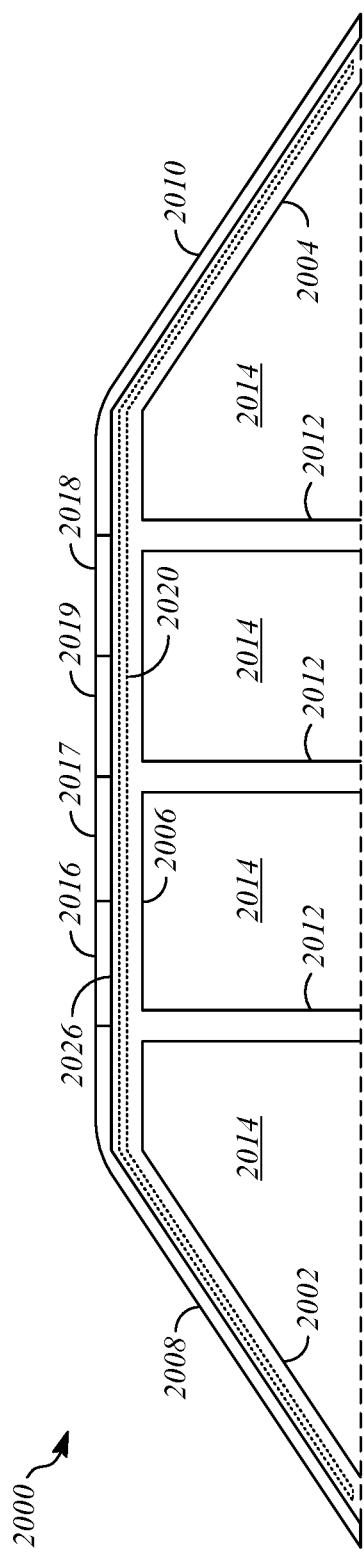
FIG. 20 is a side view of a seventh vehicle with a movable panel assembly in a closed position.
Figure 21:
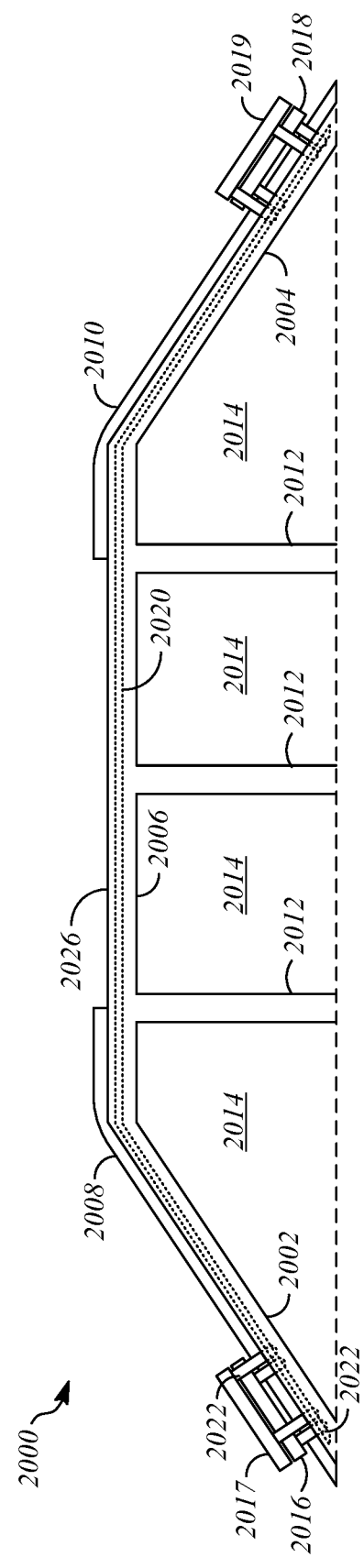
FIG. 21 is a side view of the seventh vehicle with the movable panel assembly in an open position.

FIG. 20 is a side view that shows a portion of a vehicle 2000 with a movable panel assembly in a closed position. The vehicle 2000 may include front pillars 2002, rear pillars 2004, longitudinal rails 2006, a front window 2008, a rear window 2010, intermediate pillars 2012, and side windows 2014. The movable panel assembly includes, for example, a first panel 2016, a second panel 2017, a third panel 2018, and a fourth panel 2019 that are movable between a closed position (FIG. 20) and an open position (FIG. 21).

The first panel 2016 may be directly adjacent to and/or abutting the front window 2008 or may be longitudinally spaced from the front window 2008 by an intermediate structure, such as a fixed roof portion or header (not shown) that extends between the longitudinal rails 2006. The second panel 2017 may be positioned longitudinally rearward from the first panel 2016, and the first and second panels 2016, 2017 may be adjacent and abutting in the closed position. The third panel 2018 may be positioned directly longitudinally forward from the rear window 2010. The fourth panel 2019 may be positioned longitudinally forward from the third panel 2018 and longitudinally rearward from the second panel 2017 in the closed position. The first and second panels 2016, 2017 may be at least partly transparent or translucent to admit light into the interior of the vehicle 2000, and may be formed, for example, at least partially from transparent or translucent glass or plastic.

The vehicle 2000 includes an extension assembly for causing motion of the first, second, third, and fourth panels 2016, 2017, 2018, 2019 between the closed and open positions. The extension assembly may include, for example, guide tracks 2020. The extension assembly may also include structures that connect the first, second, third, and fourth panels 2016, 2017, 2018, 2019 to the guide tracks 2020, such as linkages 2022 and associated hardware. In some embodiments, the first, second, third, and fourth panels 2016, 2017, 2018, 2019 are connected to the guide tracks 2020 by four-bar linkages. To move the first, second, third, and fourth panels 2016, 2017, 2018, 2019 with respect to the tracks, the vehicle 2000 may include an actuator assembly (not shown in FIGS. 20-21), such as electric motors connected to the first, second, third, and fourth panels 2016, 2017, 2018, 2019 by cables, as described with reference to FIG. 1.

The first, second, third, and fourth panels 2016, first, second, third, and fourth panels 2016, 2017, 2018, 2019 are in the closed position. The opening 2026 may be defined by or through a body of the vehicle 2000, such as in a roof area of the body of the vehicle 2000.

The first, second, third, and fourth panels 2016, 2017, 2018, 2019 are connected to the guide tracks 2020 such that they move along the exterior of the vehicle between the closed position and the open position, as shown in FIG. 21, which is a side view that shows a portion of the vehicle 2000 with the movable panel assembly in the open position. The first and second panels 2016, 2017 are positioned adjacent to an exterior surface of the front window 2008 in a stacked configuration and the third and fourth panels 2018, 2019 are positioned adjacent to an exterior surface of the rear window 2010 in a stacked configuration in the open position. The first, second, third, and fourth panels 2016, 2017, 2018, 2019 may be positioned near the lower ends of the front and rear pillars 2002, 2004, and/or the front and rear windows 2008, 2010, respectively.

FIG. 22 is a side cross-section view of a portion of a vehicle 2200 with a movable panel assembly in a closed position. The vehicle 2200 may include front pillars 2202, rear pillars 2204, longitudinal rails 2206, a front window 2208, a rear window 2210, and a roof structure 2238. The roof structure 2238 extends laterally across the vehicle 2200, and defines an internal space 2240 that is disposed within the roof structure 2238. The movable panel assembly includes, for example, a first panel 2216 and a second panel 2218 that are movable between a closed position (FIG. 22) and an open position (FIG. 23).

The first panel 2216 is positioned longitudinally rearward from the front window 2208 and longitudinally forward from the roof structure 2238. In the closed position, the first panel 2216 occupies and obstructs a first opening 2226 that is located rearward of the front window 2208 and forward of the roof structure 2238. The second panel 2218 is positioned longitudinally rearward from the roof structure 2238 and longitudinally forward from the rear window 2210. In the closed position, the second panel 2218 occupies and obstructs a second opening 2227 that is located rearward of the roof structure 2238 and forward of the rear window 2210. The first and second panels 2216, 2218 may be at least partly transparent or translucent to admit light into the interior of the vehicle 2200, and may be formed, for example, at least partially from transparent or translucent glass or plastic.

The vehicle 2200 includes an extension assembly for causing motion of the first and second panels 2216, 2218 between the closed and open positions. The extension assembly may include, for example, guide tracks 2220. The extension assembly may also include structures that connect the first and second panels 2216, 2218 to the guide tracks 2220, such as linkages and associated hardware. In some embodiments, the first and second panels 2216, 2218 are connected to the guide tracks 2220 by four-bar linkages. To move the first and second panels 2216, 2218 with respect to the tracks, the vehicle 2200 may include an actuator assembly (not shown in FIGS. 22-23), such as electric motors connected to the first and second panels 2216, 2218 by cables, as described with reference to FIG. 1.

The first and second panels 2216, 2218 are connected to the guide tracks 2220 such that they move along the guide tracks 2220 between the first and second openings 2226, 2227 and the internal space 2240 of the roof structure 2238 between the closed position and the open position, as shown in FIG. 23, which is a side view that shows a portion of the vehicle 2200 with the movable panel assembly in the open position. In the open position, the first panel 2216 has moved along the guide tracks 2220 downward and rearward into the internal space 2240 of the roof structure 2238, and the second panel 2218 has moved along the guide tracks 2220 downward and forward into the internal space 2240 of the roof structure 2238. In the open position, the first and second panels 2216, 2218 may be located between a front end of the roof structure 2238 and a rear end of the roof structure 2238. For example, the first and second panels 2216, 2218 may be located in a stacked configuration in the internal space 2240, such as with the first panel 2216 located directly above the second panel 2218, or with the second panel 2218 located directly above the first panel 2216. Thus, the first and second panels 2216, 2218 do not occupy or obstruct the first and second openings 2226, 2227 in the open position.

FIG. 24 is a side cross-section view of a portion of a vehicle 2400 with a movable panel assembly in a closed position. The vehicle 2400 may include front pillars 2402, rear pillars 2404, longitudinal rails 2406, a front window 2408, a rear window 2410, and a roof structure 2438. The roof structure 2438 extends laterally across the vehicle 2200, and defines an interior space 2440 that is disposed within the roof structure 2438. The movable panel assembly includes, for example, a first panel 2416 and a second panel 2418 that are movable between a closed position (FIG. 24) and an open position (FIG. 25). In the closed position, the first and second panels 2416, 2418 occupy and obstruct first and second openings 2426, 2427 that are positioned forward and rearward of the roof structure 2438. The vehicle 2400 and its various components are as described with respect to the vehicle 2200 and analogous components, except as stated herein.

The first and second panels 2416, 2418 are connected to an extension assembly that includes guide tracks 2420. The first and second panels 2416, 2418 move along the guide tracks 2420 between the first and second openings 2426, 2427 and a location within the interior of the vehicle 2400, as shown in FIG. 25, which is a side view that shows a portion of the vehicle 2400 with the movable panel assembly in the open position. In the open position, the first panel 2416 has moved along the guide tracks 2420 downward and rearward into the interior of the vehicle 2400 below the roof structure 2438, and the second panel 2418 has moved along the guide tracks 2420 downward and forward into the interior of the vehicle 2400 below the roof structure 2438. In the open position, the first and second panels 2416, 2418 may be located between a front end of the roof structure 2438 and a rear end of the roof structure 2438. The first and second panels 2416, 2418 may be located in a stacked configuration below the roof structure 2438, such as with the first panel 2416 located directly above the second panel 2418, or with the second panel 2418 located directly above the first panel 2416. Thus, the first and second panels 2416, 2418 do not occupy or obstruct the first and second openings 2426, 2427 in the open position.

Figure 26:
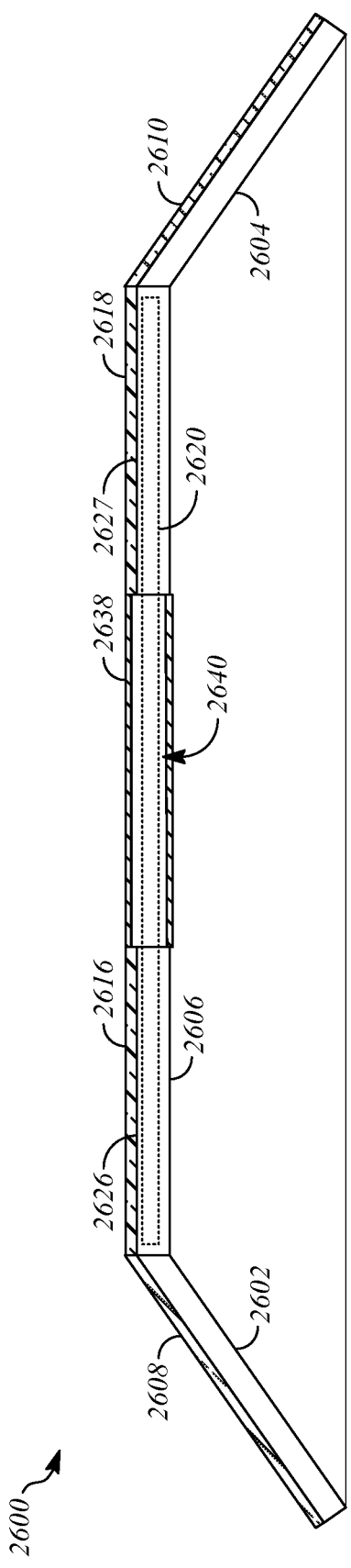
FIG. 26 is a side cross-section view of a tenth vehicle with a movable panel assembly in a closed position.
Figure 27:
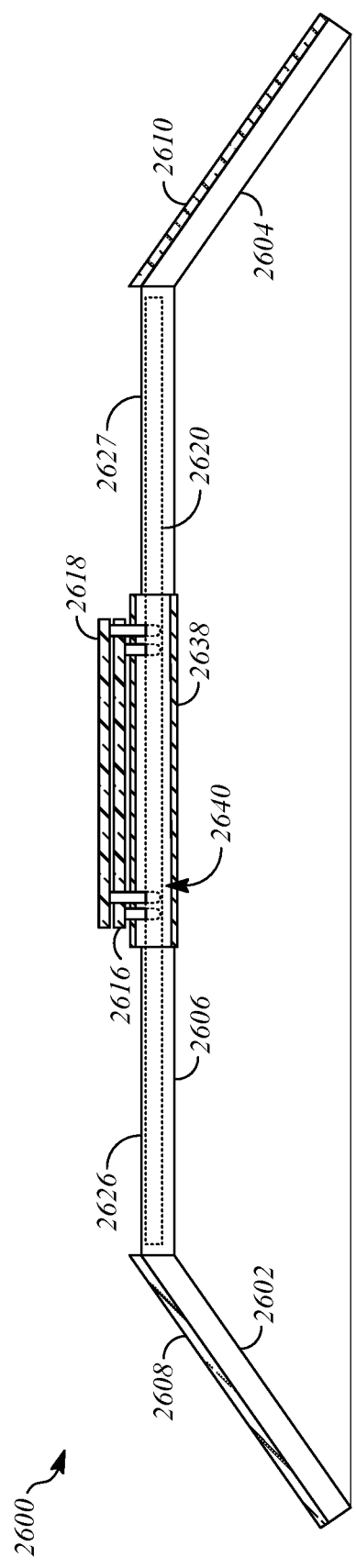
FIG. 27 is a side cross-section view of the tenth vehicle with the movable panel assembly in an open position.

FIG. 26 is a side cross-section view of a portion of a vehicle 2600 with a movable panel assembly in a closed position. The vehicle 2600 may include front pillars 2602, rear pillars 2604, longitudinal rails 2606, a front window 2608, a rear window 2610, and a roof structure 2638. The roof structure 2638 extends laterally across the vehicle 2200, and defines an interior space 2640 that is disposed within the roof structure 2638. The movable panel assembly includes, for example, a first panel 2616 and a second panel 2618 that are movable between a closed position (FIG. 26) and an open position (FIG. 27). In the closed position, the first and second panels 2616, 2618 occupy and obstruct first and second openings 2626, 2627 that are positioned forward and rearward of the roof structure 2638. The vehicle 2600 and its various components are as described with respect to the vehicle 2200 and analogous components, except as stated herein.

The first and second panels 2616, 2618 are connected to an extension assembly that includes guide tracks 2620. The first and second panels 2616, 2618 move along the guide tracks 2620 between the first and second openings 2626, 2627 and a location at the exterior of the vehicle 2600, as shown in FIG. 27, which is a side view that shows a portion of the vehicle 2600 with the movable panel assembly in the open position. In the open position, the first panel 2616 has moved along the guide tracks 2620 upward and rearward to the exterior of the vehicle 2600 and is located above the roof structure 2638 and adjacent to an exterior surface of the roof structure 2638. The second panel 2618 has moved along the guide tracks 2620 upward and forward to the exterior of the vehicle 2600 above the roof structure 2638 to a location that is adjacent to an exterior surface of the roof structure 2638. In the open position, the first and second panels 2616, 2618 may be located between a front end of the roof structure 2638 and a rear end of the roof structure 2638. For example, the first and second panels 2616, 2618 may be located in a stacked configuration below the roof structure 2638, such as with the first panel 2616 located directly above the second panel 2618, or with the second panel 2618 located directly above the first panel 2616. Thus, the first and second panels 2616, 2618 do not occupy or obstruct the first and second openings 2626, 2627 in the open position.

Figure 28:
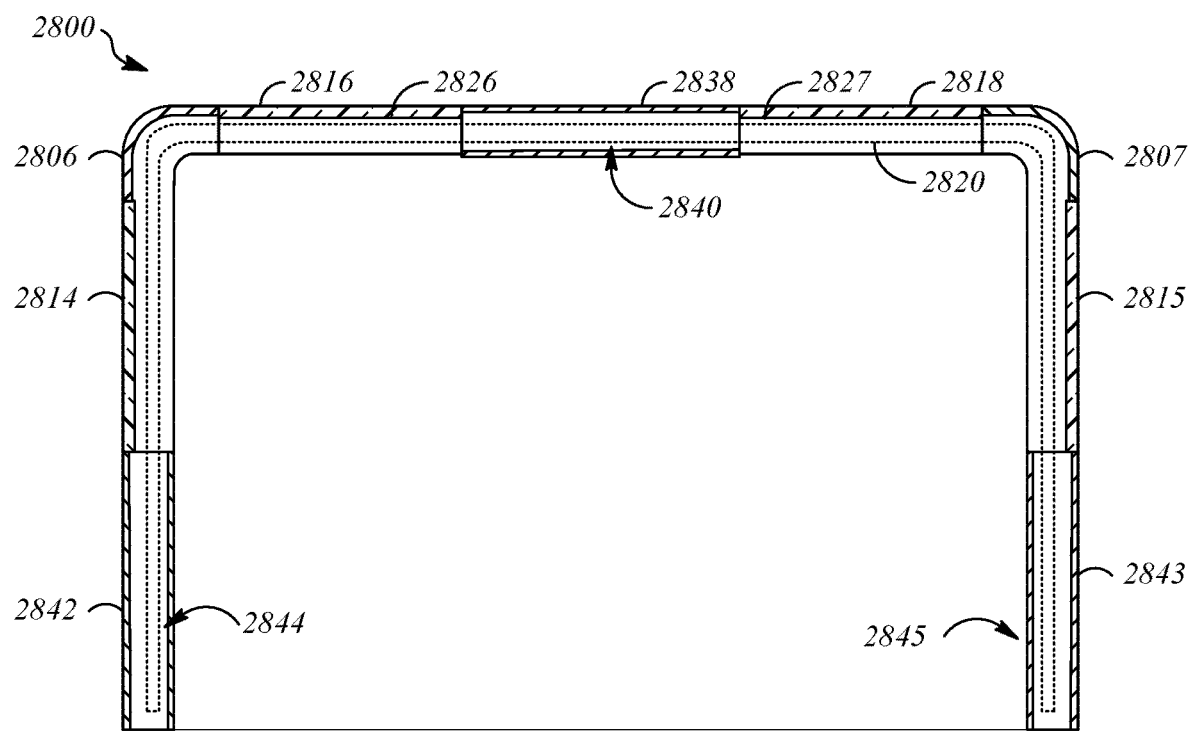
FIG. 28 is a front cross-section view of an eleventh vehicle with a movable panel assembly in a closed position.

FIG. 28 is a front cross-section view of a portion of a vehicle 2800 with a movable panel assembly in a closed position. The vehicle 2800 may include a roof structure 2838 that extends in the longitudinal direction of the vehicle 2800. The roof structure 2838 may define an interior space 2840. The vehicle 2800 may also include first and second longitudinal rails 2806, 2807, first and second side windows 2814, 2815, and first and second side doors 2842, 2843. The first and second side windows 2814, 2815 may be positioned downward from the first and second longitudinal rails 2806, 2807, and the first and second side doors 2842, 2843 may be positioned downward from the first and second side windows 2814, 2815. The first and second side doors 2842, 2843 may define respective interior spaces 2844, 2845.

Figure 29:
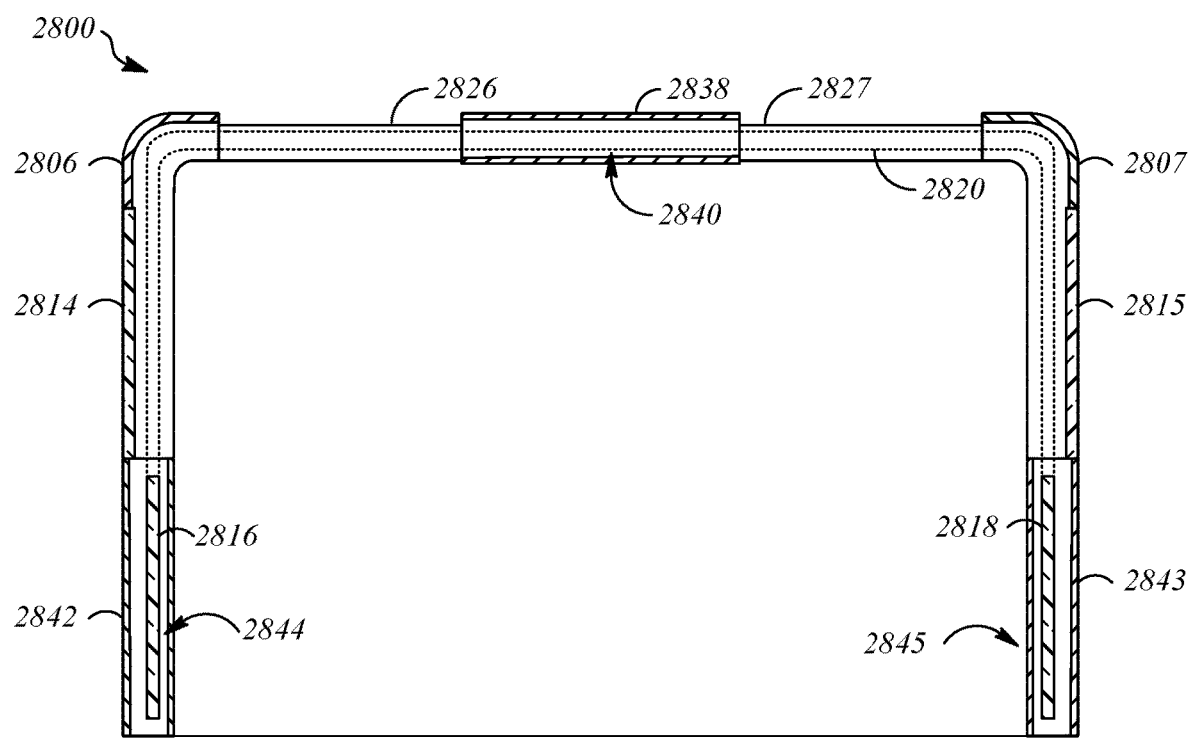
FIG. 29 is a front cross-section view of the eleventh vehicle with the movable panel assembly in an open position.

The movable panel assembly includes, for example, a first panel 2816 that is positioned on a first lateral side of the roof structure 2838, and a second panel 2818 that is positioned on a second lateral side of the roof structure 2838. The first and second panels are movable between a closed position (FIG. 28) and an open position (FIG. 29). In the closed position, the first and second panels 2816, 2818 occupy and obstruct first and second openings 2826, 2827 that are positioned on the first and second lateral sides of the roof structure 2838. The first and second openings 2826, 2827 may extend from the roof structure 2838 to the first and second longitudinal rails 2806, 2807, respectively. In some embodiments, the first and second longitudinal rails 2806, 2807 are omitted, and the first and second openings may extend from the roof structure 2838 to the first and second side windows 2814, 2815, respectively. In some embodiments, the roof structure 2838 is omitted, and the first and second panels 2816, 2818 may meet near a lateral center of the vehicle 2800.

The first and second panels 2816, 2818 are connected to an extension assembly that includes guide tracks 2820. The first and second panels 2816, 2818 move along the guide tracks 2820 between the first and second openings 2826, 2827 and the interior spaces 2844, 2845 of the first and second side doors 2842, 2843, as shown in FIG. 29, which is a front cross-section view that shows a portion of the vehicle 2800 with the movable panel assembly in the open position. In the open position, the first panel 2816 has moved outward along the guide tracks 2820 toward the first longitudinal rail 2806 and the first side window 2814, and then downward along the guide tracks 2820 into the interior space 2844 of the first side door 2842. The second panel 2818 has moved outward along the guide tracks 2820 toward the second longitudinal rail 2807 and the second side window 2815, and then downward along the guide tracks 2820 into the interior space 2845 of the second side door 2843. Thus, the first and second panels 2816, 2818 do not occupy or obstruct the first and second openings 2826, 2827 in the open position.

Figure 30:
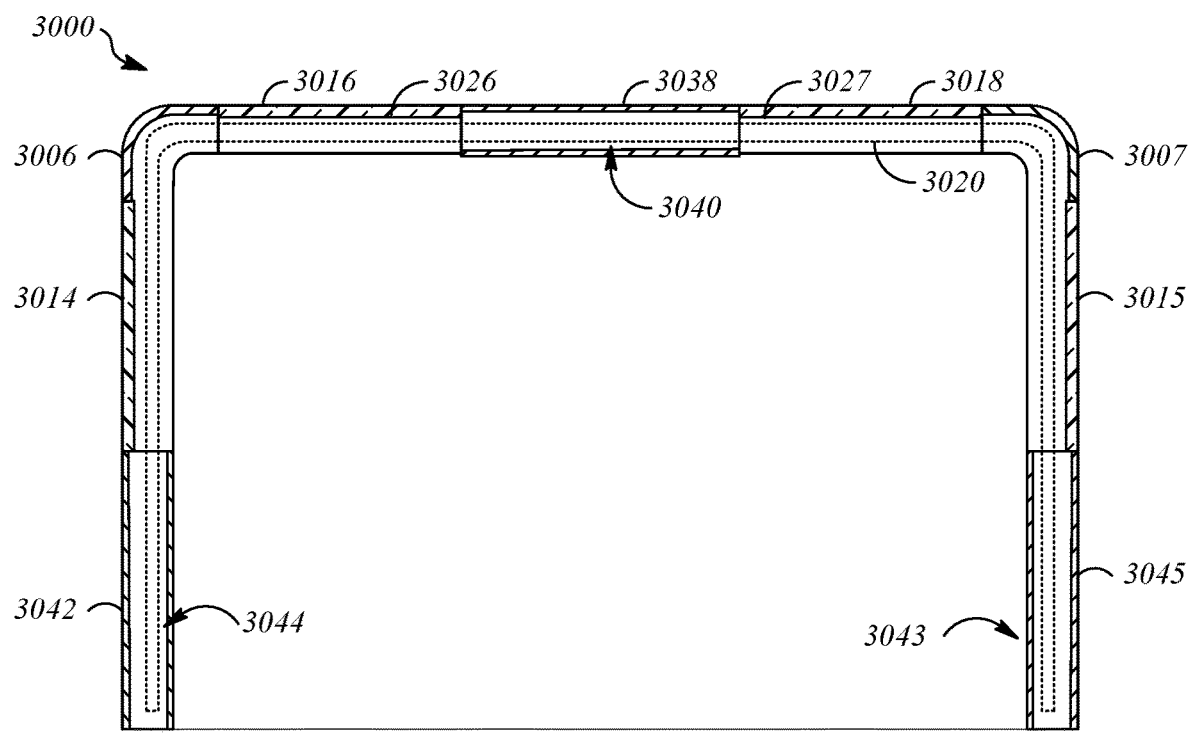
FIG. 30 is a front cross-section view of a twelfth vehicle with a movable panel assembly in a closed position.

FIG. 30 is a front cross-section view of a portion of a vehicle 3000 with a movable panel assembly in a closed position. The vehicle 3000 may include a roof structure 3038 that extends in the longitudinal direction of the vehicle 3000. The vehicle 3000 may also include first and second longitudinal rails 3006, 3007, first and second side windows 3014, 3015, and first and second side doors 3042, 3043. The first and second side windows 3014, 3015 may be positioned downward from the first and second longitudinal rails 3006, 3007, and the first and second side doors 3042, 3043 may be positioned downward from the first and second side windows 3014, 3015. The first and second side doors 3042, 3043 may define respective interior spaces 3044, 3045. The vehicle 3000 and its various components are as described with respect to the vehicle 2800 and analogous components, except as stated herein.

Figure 31:
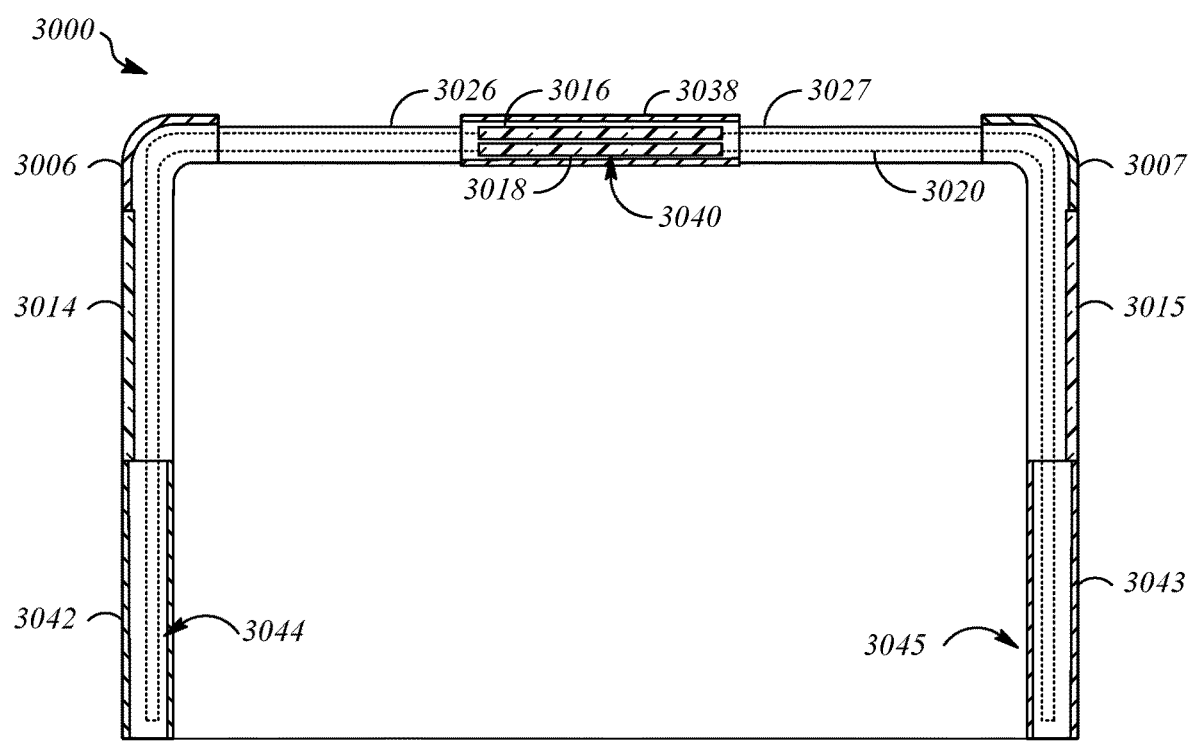
FIG. 31 is a front cross-section view of the twelfth vehicle with the movable panel assembly in an open position.

The movable panel assembly of the vehicle 3000 includes, for example, first and second panels 3016, 3018 that are positioned in first and second openings 3026, 3027 on respective lateral sides of the roof structure 3038 to occupy and obstruct the first and second openings 3026, 3027 in the closed position. The first and second panels 3016, 3018 are connected to an extension assembly that includes guide tracks 3020 for movement between the first and second openings 3026, 3027 and the interior space 3040 of the roof structure 3038, as shown in FIG. 31, which is a front cross-section view that shows a portion of the vehicle 3000 with the movable panel assembly in the open position. In the open position, the first panel 3016 has moved inward and downward along the guide tracks 3020 into the interior space 3040 of the roof structure 3038, and the second panel 3018 has moved inward and downward along the guide tracks 3020 into the interior space 3040 of the roof structure 3038. The first and second panels 3016, 3018 may be in a stacked configuration within the interior space 3040 of the roof structure 3038 in the open position. Thus, the first and second panels 3016, 3018 do not occupy or obstruct the first and second openings 3026, 3027 in the open position.

Figure 32:
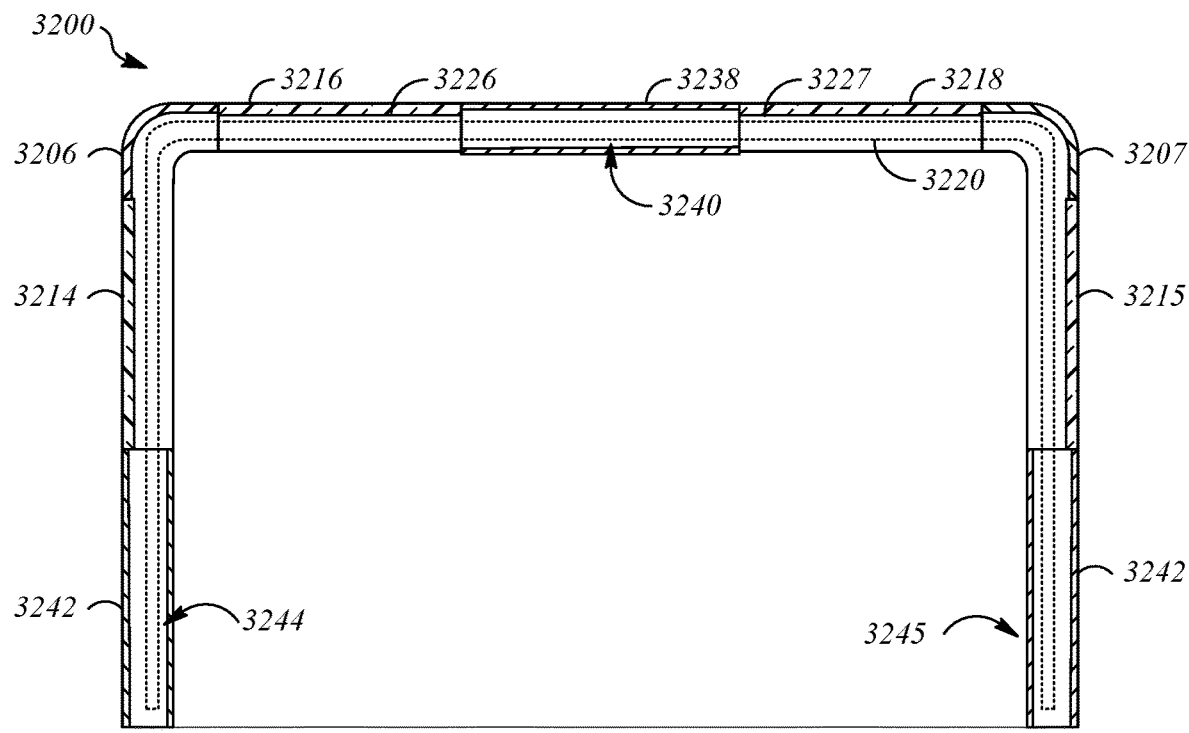
FIG. 32 is a front cross-section view of a thirteenth vehicle with a movable panel assembly in a closed position.

FIG. 32 is a front cross-section view of a portion of a vehicle 3200 with a movable panel assembly in a closed position. The vehicle 3200 may include a roof structure 3238 that extends in the longitudinal direction of the vehicle 3200. The roof structure 3238 may define an interior space 3240. The vehicle 3200 may also include first and second longitudinal rails 3206, 3207, first and second side windows 3214, 3215, and first and second side doors 3242, 3243. The first and second side windows 3214, 3215 may be positioned downward from the first and second longitudinal rails 3206, 3207, and the first and second side doors 3242, 3243 may be positioned downward from the first and second side windows 3214, 3215. The first and second side doors 3242, 3243 may define respective interior spaces 3244, 3245. The vehicle 3200 and its various components are as described with respect to the vehicle 2800 and analogous components, except as stated herein.

Figure 33:
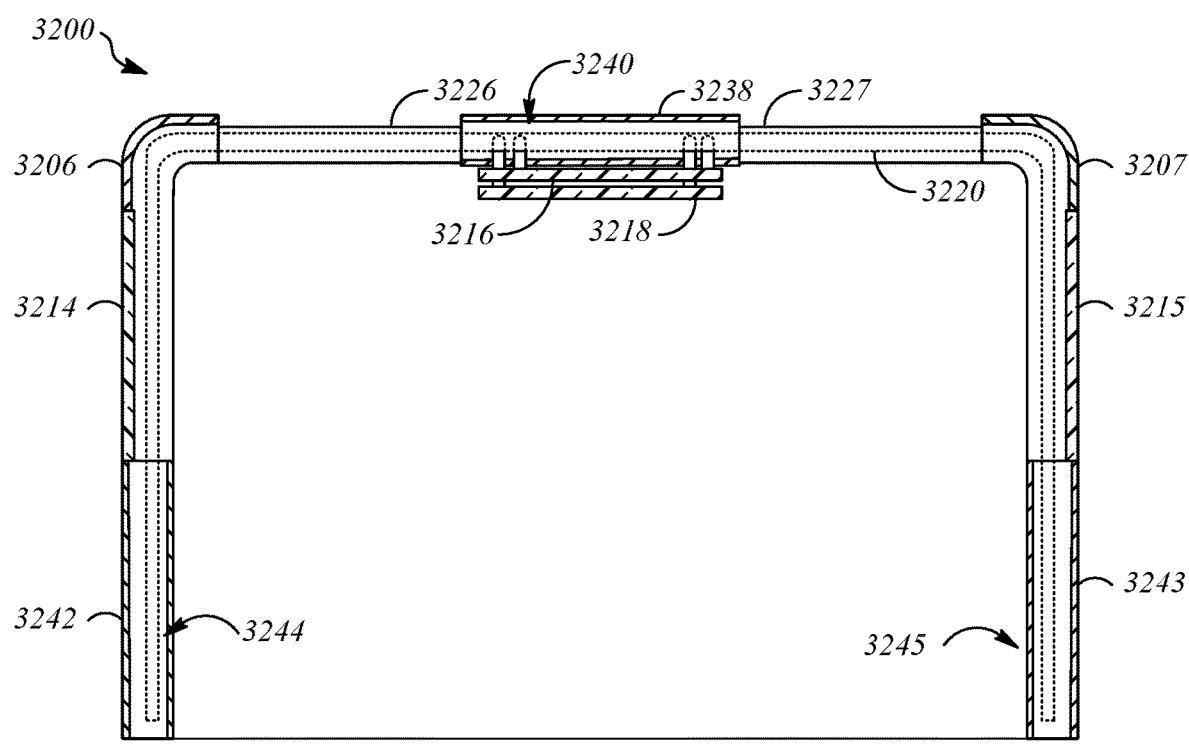
FIG. 33 is a front cross-section view of the thirteenth vehicle with the movable panel assembly in an open position.

The movable panel assembly of the vehicle 3200 includes, for example, first and second panels 3216, 3218 that are positioned in first and second openings 3226, 3227 on respective lateral sides of the roof structure 3238 to occupy and obstruct the first and second openings 3226, 3227 in the closed position. The first and second panels 3216, 3218 are connected to an extension assembly that includes guide tracks 3220 for movement between the first and second openings 3226, 3227 and a location inside the vehicle 3200, as shown in FIG. 33, which is a front cross-section view that shows a portion of the vehicle 3200 with the movable panel assembly in the open position. In the open position, the first panel 3216 has moved inward and downward along the guide tracks 3220 into the interior of the vehicle 3200, and the second panel 3218 has moved inward and downward along the guide tracks 3220 into the interior of the vehicle 3200. The first and second panels 3216, 3218 may be in a stacked configuration at a location that is in the interior of the vehicle 3200 below the roof structure 3238 in the open position. Thus, the first and second panels 3216, 3218 do not occupy or obstruct the first and second openings 3226, 3227 in the open position.

Figure 34:
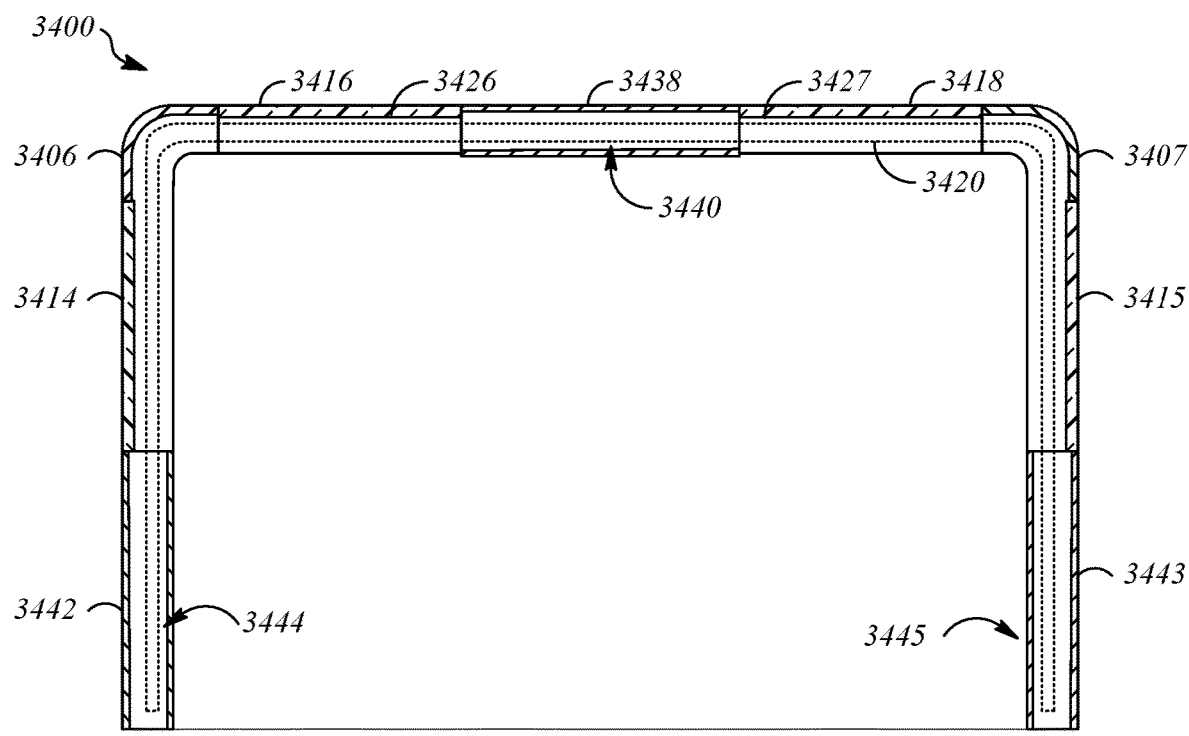
FIG. 34 is a front cross-section view of a fourteenth vehicle with a movable panel assembly in a closed position.

FIG. 34 is a front cross-section view of a portion of a vehicle 3400 with a movable panel assembly in a closed position. The vehicle 3400 may include a roof structure 3438 that extends in the longitudinal direction of the vehicle 3400. The roof structure 3438 may define an interior space 3440. The vehicle 3400 may also include first and second longitudinal rails 3406, 3407, first and second side windows 3414, 3415, and first and second side doors 3442, 3443. The first and second side windows 3414, 3415 may be positioned downward from the first and second longitudinal rails 3406, 3407, and the first and second side doors 3442, 3443 may be positioned downward from the first and second side windows 3414, 3415. The first and second side doors 3442, 3443 may define respective interior spaces 3444, 3445. The vehicle 3400 and its various components are as described with respect to the vehicle 2800 and analogous components, except as stated herein.

Figure 35:
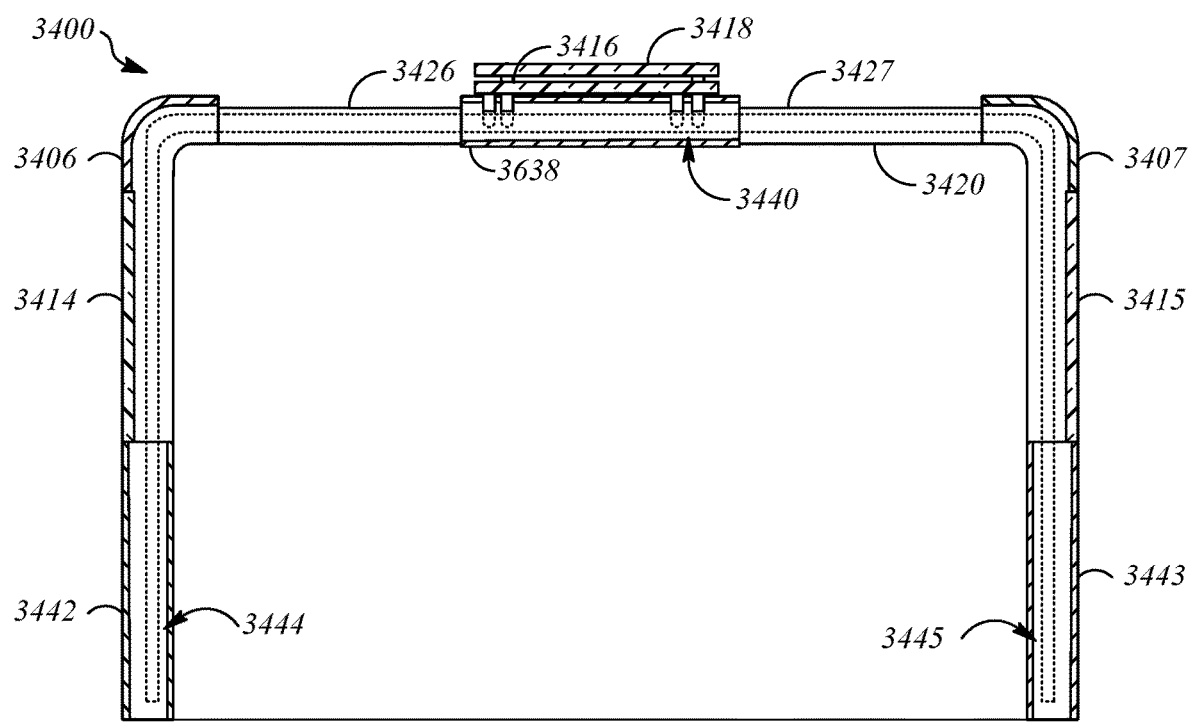
FIG. 35 is a front cross-section view of the fourteenth vehicle with the movable panel assembly in an open position.

The movable panel assembly of the vehicle 3400 includes, for example, first and second panels 3416, 3418 that are positioned in first and second openings 3426, 3427 on respective lateral sides of the roof structure 3438 to occupy and obstruct the first and second openings 3426, 3427 in the closed position. The first and second panels 3416, 3418 are connected to an extension assembly that includes guide tracks 3420 for movement between the first and second openings 3426, 3427 and a location on the exterior of the vehicle 3400, as shown in FIG. 35, which is a front cross-section view that shows a portion of the vehicle 3400 with the movable panel assembly in the open position. In the open position, the first panel 3416 has moved inward and upward along the guide tracks 3420 to the exterior of the vehicle 3400, and the second panel 3418 has moved inward and upward along the guide tracks 3420 to the exterior of the vehicle 3400. The first and second panels 3416, 3418 may be in a stacked configuration at a location that is at the exterior of the vehicle 3400 above the roof structure 3438 in the open position. Thus, the first and second panels 3416, 3418 do not occupy or obstruct the first and second openings 3426, 3427 in the open position.

Figure 36:
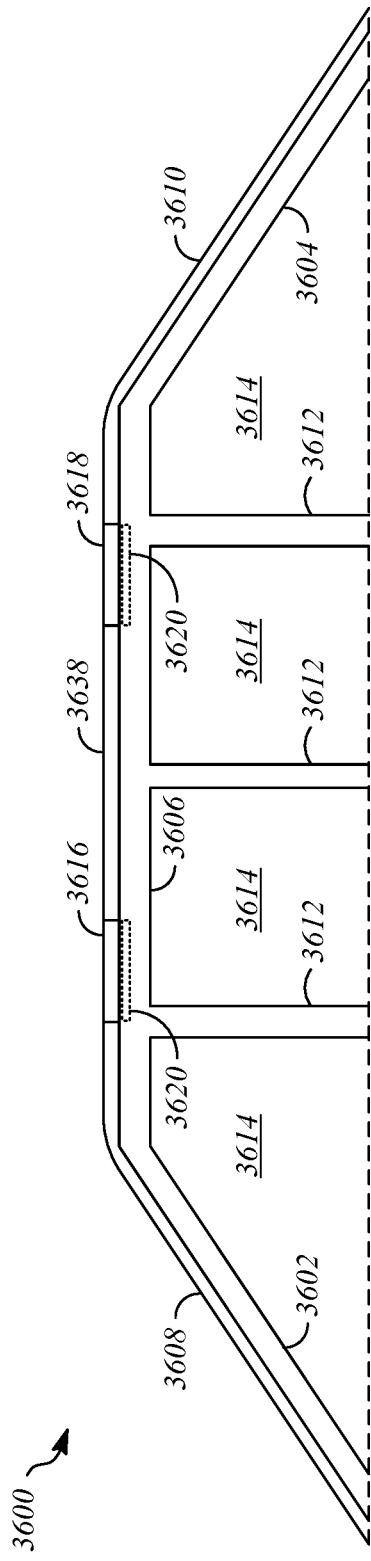
FIG. 36 is a side view of a fifteenth vehicle with a movable panel assembly in a closed position.
Figure 37:
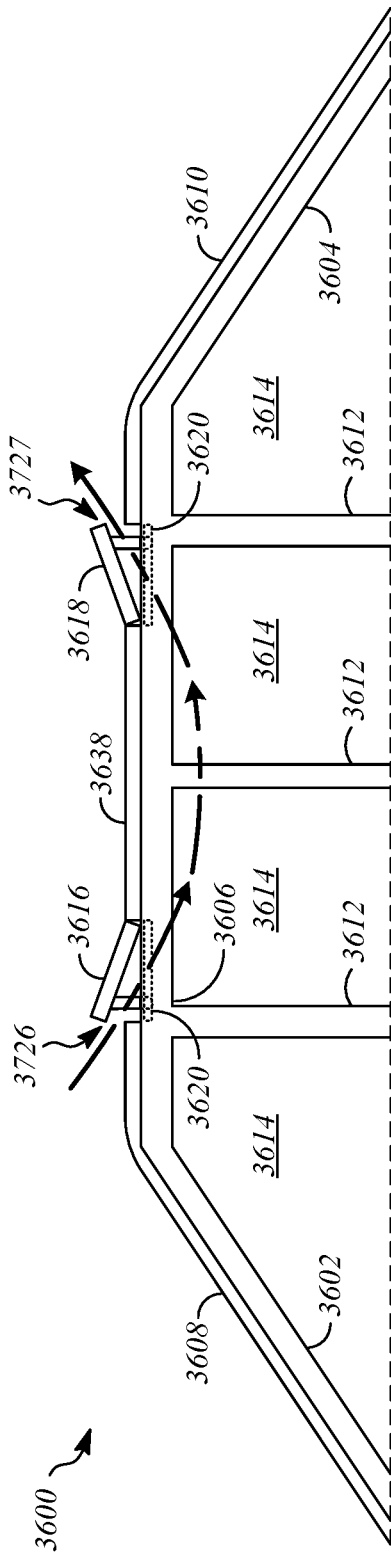
FIG. 37 is a side view of the fifteenth vehicle with the movable panel assembly in an open position.

FIGS. 36-37 show a portion of a vehicle 3600. The vehicle 3600 may include front pillars 3602, rear pillars 3604, longitudinal rails 3606, a front window 3608, a rear window 3610, intermediate pillars 3612, and side windows 3614.

The vehicle 3600 has a movable panel assembly that includes, for example, a first panel 3616 and a second panel 3618 that are movable between a closed position (FIG. 36) and an open position (FIG. 37).

The first panel 3616 is positioned longitudinally rearward from the front window 3608. The first panel 3616 may be directly adjacent to and/or abutting the front window 3608 or may be longitudinally spaced from the front window 3608 by an intermediate structure, such as a fixed roof portion or header (not shown) that extends between the longitudinal rails 3606. The second panel 3618 may be positioned directly longitudinally forward from the rear window 3610. A roof structure 3638, such as a fixed roof panel, may be located longitudinally between the first panel 3616 and the second panel 3618. The first and second panels 3616, 3618 may be at least partly transparent or translucent to admit light into the interior of the vehicle 3600, and may be formed, for example, at least partially from transparent or translucent glass or plastic.

The vehicle 3600 includes an extension assembly for causing motion of the first and second panels 3616, 3618 between the closed and open positions. The extension assembly may include, for example, guide tracks 3620 and connecting structures. The vehicle 3600 may include an actuator assembly (not shown in FIGS. 36-37), such as electric motors connected to the first and second panels 3616, 3618 by cables, as described with reference to FIG. 1.

The first and second panels 3616, 3618 are closed and do not allow admission of air into the interior of the vehicle 3600 in the closed position, but are movable to allow admission of air in the open position. In the open position, the first and second panels 3616, 3618 are pivoted upwards relative to the closed position. The first panel 3616 is pivoted such that a leading edge is higher than a trailing edge of the first panel 3616 to define a front-to-rear decline and to define a front-facing opening 3726. The front-facing opening 3726 allows air to flow into the vehicle 3600 during forward motion of the vehicle 3600. The second panel 3618 is pivoted such that a trailing edge is higher than a leading edge of the second panel 3618 to define a front-to-rear incline and to define a rear-facing opening 3727. The front-facing opening 3726 allows air to flow into the vehicle 3600 during forward motion of the vehicle 3600. Thus, air may flow through the vehicle 3600 when the first and second panels 3616, 3618 are in the open position. In some embodiments, movement of the first and second panels 3616, 3618 from the open position to the closed position occurs without significant longitudinal or lateral motion of the first and second panels 3616, 3618.

FIG. 38 is a side view of a vehicle 3800 with a movable panel assembly in a closed position. The vehicle 3800 may include front pillars 3802, rear pillars 3804, longitudinal rails 3806, a front window 3808, a rear window 3810, intermediate pillars 3812, and side windows 3814.

The movable panel assembly of the vehicle 3800 may include, for example, a panel 3816 that is movable between a closed position (FIG. 38) and an open position (FIG. 39). In the closed position, the panel 3816 may occupy and obstruct an opening 3826 that is formed in a roof area of the vehicle 3800.

The panel 3816 is positioned longitudinally rearward from the front window 3808. The panel 3816 may be directly adjacent to and/or abutting the front window 3808 or may be longitudinally spaced from the front window 3808 by an intermediate structure, such as a fixed roof portion or header (not shown) that extends between the longitudinal rails 3806. The panel 3816 may be positioned longitudinally forward from the rear window 3810. The panel 3816 may be directly adjacent to and/or abutting the rear window 3810 or may be longitudinally spaced from the rear window 3810 by an intermediate structure, such as a fixed roof portion or header (not shown) that extends between the longitudinal rails 3806. In some embodiments, the vehicle 3800 includes one or more additional panels that are positioned longitudinally forward or rearward of the panel 3816 and are configured and operate in a similar manner. The panel 3816 may be at least partly transparent or translucent to admit light into the interior of the vehicle 3800, and may be formed, for example, at least partially from transparent or translucent glass or plastic. In some embodiments, a fixed roof panel 3838 may be located longitudinally rearward of the panel 3816, such that the fixed roof panel 3838 is located between the panel 3816 and the rear window 3810 in the closed position.

The vehicle 3800 includes an extension assembly for causing motion of the panel 3816 between the closed and open positions. The extension assembly may include, for example, guide tracks 3820 and connecting structures. The vehicle 3800 may include an actuator assembly (not shown in FIGS. 38-39), such as electric motors connected to the panel 3816, as described with reference to FIG. 1.

The panel 3816 is closed and does not allow admission of air into the interior of the vehicle 3800 in the closed position, but is movable to allow admission of air in the open position. The panel 3816 is movable to allow admission of air into the interior of the vehicle, as shown in FIG. 39, which is a side view of the vehicle 3800 with the movable panel assembly in the open position. In the open position, the panel 3816 is moved rearward so that it is positioned one of above, within, or below the fixed roof panel 3838 and/or the rear window 3810. In the illustrated example of FIG. 39, the panel 3816 is located at the exterior of the vehicle 3800, above and adjacent to the fixed roof panel 3838 and/or the rear window 3810.

The vehicle 3800 includes a front window motion mechanism 3834. The front window motion mechanism 3834 is connected to the front window 3808 and is operable to move the front window 3808, such as by translation upward, translation forward, translation upward and forward, or by pivoting the front window 3808. As an example, the center of rotation of the pivot may be at a base of the front window 3808, such as at or near a lowest point of the front window 3808. The front window motion mechanism 3834 may include suitable components for supporting the front window 3808, such as hinges or linkages (for example, one or more four-bar linkages). In some embodiments, movement of the front window 3808 is constrained over a limited range of motion, such as a maximum of 100 millimeters of upward travel toward the open position relative to the closed position.

In the closed position (FIG. 38), the trailing edge of the front window 3808 may be vertically aligned with the leading edge of the panel 3816. When the movable panel assembly moves from the closed position to the open position, the front window motion mechanism 3834 moves the window to raise the trailing edge of the front window 3808 upward. As an example, the trailing edge of the front window 3808 may be raised by between 20 and 100 millimeters. By raising the trailing edge of the front window 3808, an airflow path 3946 of air over the vehicle 3800 is raised such that air is directed over the opening 3826 while the vehicle 3800 travels forward. By raising the airflow path 3946, effects of air moving over the opening 3826, such as buffeting, may be reduced or eliminated.

Figure 40:
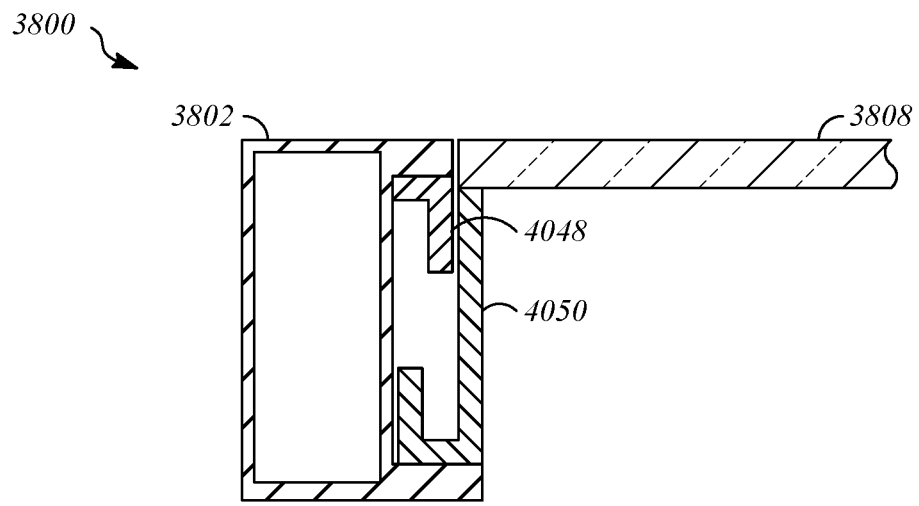
FIG. 40 is a cross-section view taken along line 40-40 of FIG. 38 showing a portion of the sixteenth vehicle with the movable panel assembly in the closed position.
Figure 41:
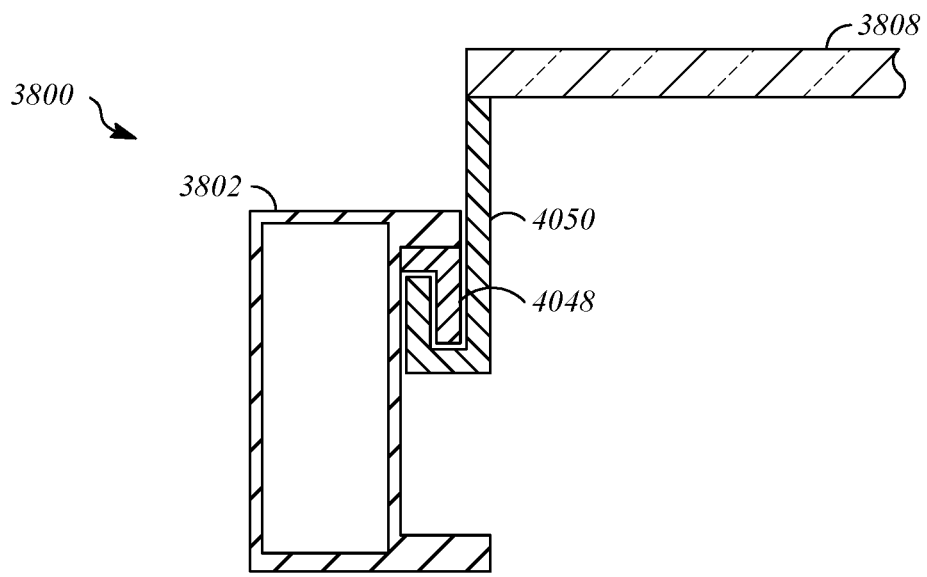
FIG. 41 is a cross-section view taken along line 41-41 of FIG. 39 showing a portion of the sixteenth vehicle with the movable panel assembly in the open position.

An interface area where the front pillars 3802 meet the front window 3808 will be described with reference to FIG. 40, which is a cross-section view taken along line 40-40 of FIG. 38 showing a portion of the sixteenth vehicle with the movable panel assembly in the closed position. In order to establish a limited range of motion for the front window 3808 relative to the front pillars 3802, a pillar-side interface member 4048 is connected to each of the front pillars 3802, and a window-side interface member 4050 is connected to each lateral side of the front window 3808. The pillar-side interface member 4048 and the window-side interface member 4050 may each extend along the front pillars 3802 and the lateral sides of the front window 3808. The pillar-side interface member 4048 and the window-side interface member 4050 are configured such that they permit relative motion until a limit of upward travel for the front window 3808 is reached, as shown in FIG. 41, which is a cross-section view taken along line 41-41 of FIG. 39 showing a portion of the vehicle 3800 with the movable panel assembly in the open position. In the illustrated embodiment, the pillar-side interface member 4048 and the window-side interface member 4050 each have a j-shaped cross-sectional configuration, such that the pillar-side interface member 4048 and the window-side interface member 4050 interlock with each other at the upper limit of travel of the front window 3808, and this engagement between the pillar-side interface member 4048 and the window-side interface member 4050 restrains further upward movement of the front window 3808.

Figure 42:
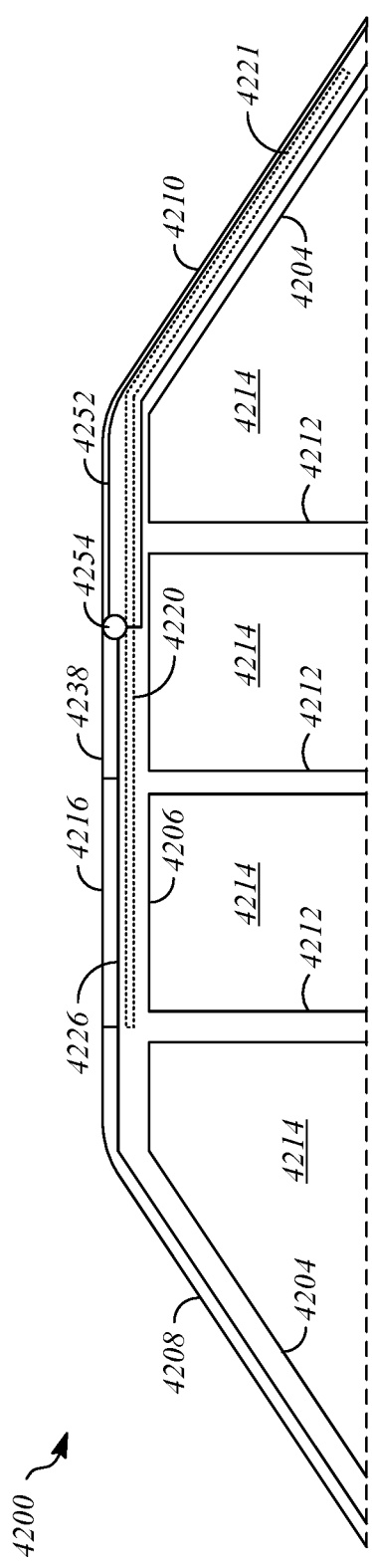
FIG. 42 is a side view of a seventeenth vehicle with a movable panel assembly in a closed position.

FIG. 42 is a side view of a vehicle 4200 with a movable panel assembly in a closed position. The vehicle 4200 may include front pillars 4202, rear pillars 4204, longitudinal rails 4206, a front window 4208, a rear window 4210 that is part of rear door 4252, a hinge structure 4254, intermediate pillars 4212, and side windows 4214. The hinge structure 5254 connects the rear door 4252 to the rear pillars 4204 and/or the longitudinal rails 4206 for movement between a lowered position (FIG. 42) of the rear door 4252 and a raised position (FIGS. 43-44) of the rear door 4252.

Figure 43:
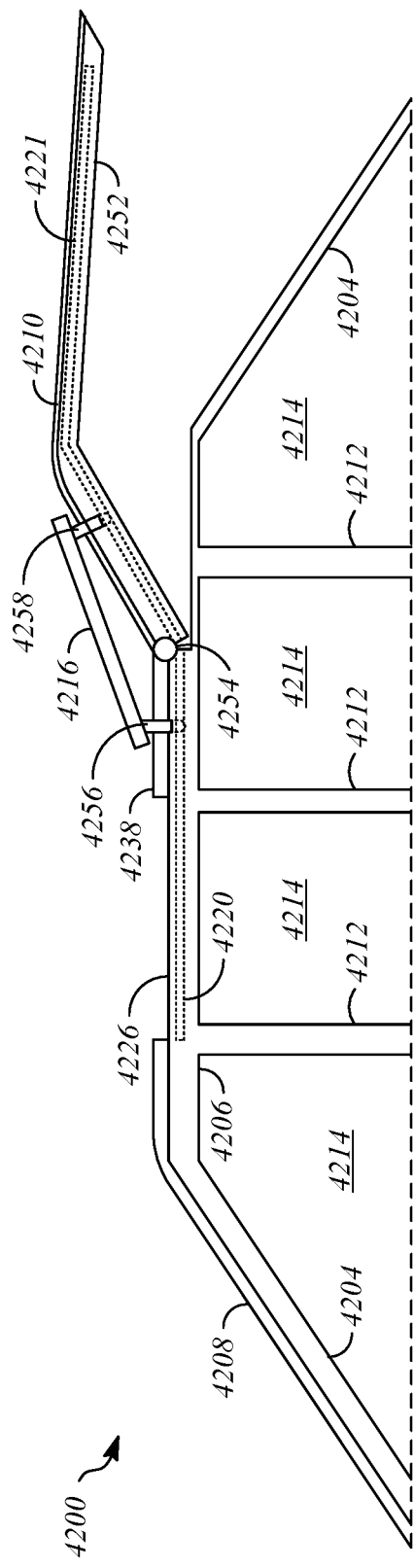
FIG. 43 is a side view of a seventeenth vehicle with a movable panel assembly in a first open position.
Figure 44:
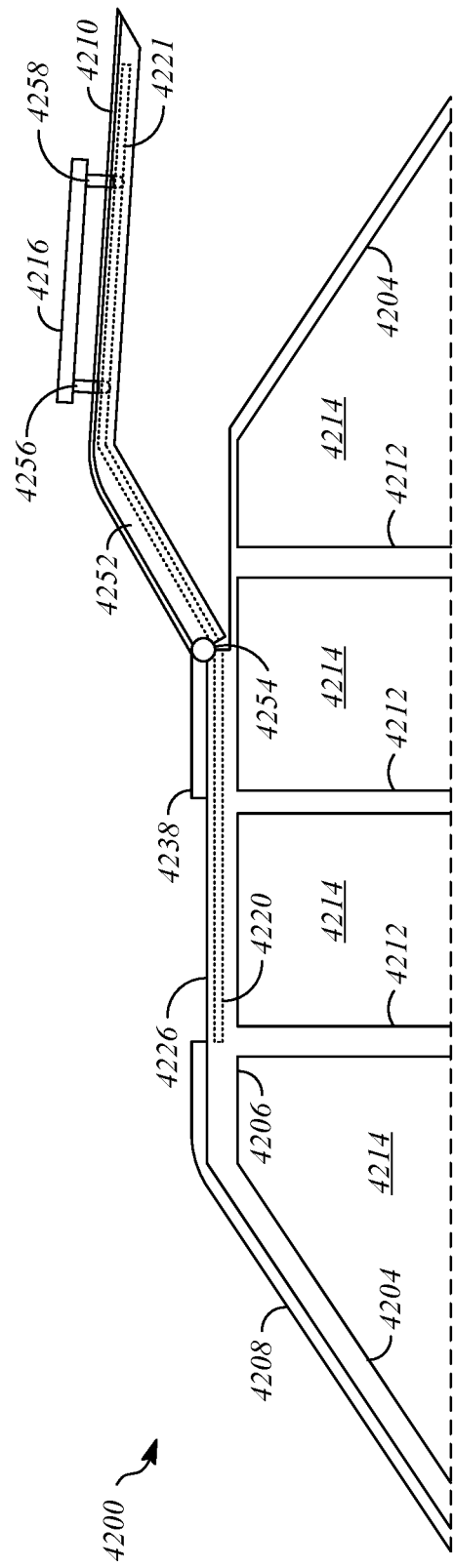
FIG. 44 is a side view of a seventeenth vehicle with a movable panel assembly in a second open position.

The movable panel assembly of the vehicle 4200 may include, for example, a panel 4216 that is movable between a closed position (FIG. 42) and an open position (FIGS. 43-44). In the closed position, the panel 4216 may occupy and obstruct an opening 4226 that is formed in a roof area of the vehicle 4200.

The panel 4216 is positioned longitudinally rearward from the front window 4208. The panel 4216 may be directly adjacent to and/or abutting the front window 4208 or may be longitudinally spaced from the front window 4208 by an intermediate structure, such as a fixed roof portion or header (not shown) that extends between the longitudinal rails 4206. The panel 4216 may be positioned longitudinally forward from the rear door 4252. The panel 4216 may be directly adjacent to and/or abutting the rear window 4208 or may be longitudinally spaced from the rear window 4210 by an intermediate structure, such as a fixed roof panel 4238 that extends between the longitudinal rails 4206 such that the fixed roof panel 4238 is located between the panel 4216 and the rear door 4252 in the closed position. In some embodiments, the vehicle 4200 includes one or more additional panels that are positioned longitudinally forward or rearward of the panel 4216 and are configured and operate in a similar manner. The panel 4216 may be at least partly transparent or translucent to admit light into the interior of the vehicle 4200, and may be formed, for example, at least partially from transparent or translucent glass or plastic.

The vehicle 4200 includes an extension assembly for causing motion of the panel 4216 between the closed and open positions. The extension assembly may include, for example, first guide tracks 4220 formed on the longitudinal rails, second guide tracks 4221 formed on the rear door 4252, a front connecting structure 4256, and a rear connecting structure 4258 (FIGS. 43-44) that are connected to the first and second guide tracks 4220, 4221 and are pivotally connected to the panel 4216. The vehicle 4200 may include an actuator assembly (not shown in FIGS. 42-44), such as electric motors connected to the panel 4216, as described with reference to FIG. 1.

The panel 4216 is closed and does not allow admission of air into the interior of the vehicle 4200 in the closed position, but is movable to allow admission of air in the open position. The panel 4216 is movable to allow admission of air into the interior of the vehicle, as shown in FIGS. 43-44, which is a side view of the vehicle 4200 with the movable panel assembly in a first open position (FIG. 43) and a second open position (FIG. 44), with the rear door 4252 shown in the raised position.

As the panel 4216 moves from the closed position to the first open position, the rear connecting structures 4258 slides from the first guide tracks 4220 onto the second guide tracks 4221. Thus, the panel 4216 is connected to the longitudinal rails 4206 by the front connecting structures 4256 and to the rear door 4252 by the rear connecting structures 4258 in the first open position. Pivoting of the front and rear connecting structures relative to the panel 4216, such as by pivot joints, allows sliding movement of the panel 4216 along the first and second guide tracks 4220, 4221 in the first open position, and allows movement of the rear door 4252 between the lowered and raised positions while the panel 4216 is connected to both the longitudinal rails 4206 and the rear door 4252. The panel 4216 may continue to slide along the first and second guide tracks 4220, 4221 from the first open position toward the second open position until the front connecting structures 4256 slide from the first guide tracks 4220 to the second guide tracks 4221, at which point the panel 4216 is connected only to the rear door 4252 by the connection of the front and rear connecting structures 4256, 4258 to the second guide tracks 4221, which are connected to the rear door 4252.

What is claimed is:

1. A vehicle, comprising:
   a roof opening;
   a front window that is located forward from the roof opening;
   a rear window that is located rearward from the roof opening;
   a rigid first panel; and
   a rigid second panel,
   wherein the first panel and the second panel obstruct the roof opening in a closed position and are movable to an open position in which the first panel is positioned adjacent to an exterior surface of the front window and the second panel is positioned adjacent to an exterior surface of the rear window.

2. The vehicle of claim 1, wherein the first panel is located near a lower end of the front window in the open position and the second panel is located near a lower end of the rear window in the open position.

3. The vehicle of claim 1, further comprising:
   front pillars, wherein the front window extends between the front pillars in a transverse direction and the first panel is located near lower ends of the front pillars in the open position; and
   rear pillars, wherein the rear window extends between the rear pillars in the transverse direction and the second panel is located near lower ends of the rear pillars in the open position.

4. The vehicle of claim 1, wherein the first panel is positioned rearward from the front window in the closed position, the second panel is positioned rearward from the first panel in the closed position, and the second panel is positioned forward from the rear window in the closed position.

5. The vehicle of claim 1, wherein the first panel and the second panel move along an exterior of the vehicle between the closed position and the open position.

6. The vehicle of claim 1, wherein at least part of the first panel is at least translucent and at least part of the second panel is at least translucent.

7. A vehicle, comprising:
   a front window;
   a rear window;
   an opening that is located between the front window and the rear window; and
   a rigid panel that obstructs the opening in a closed position and is slidable to an open position in which the panel is positioned adjacent to an exterior surface of the front window.

8. The vehicle of claim 7, wherein the panel is located near a lower end of the front window in the open position.

9. The vehicle of claim 7, further comprising:
   front pillars, wherein the front window extends between the front pillars in a transverse direction and the panel is located near lower ends of the front pillars in the open position.

10. The vehicle of claim 7, wherein the panel moves along an exterior of the vehicle between the closed position and the open position.

11. The vehicle of claim 7, wherein at least part of the panel is at least translucent.

12. A vehicle, comprising:
    a roof opening;
    a front window;
    a rear window;
    a first panel;
    a second panel;
    a third panel; and
    a fourth panel,
    wherein the first panel, the second panel, the third panel, and the fourth panel obstruct the roof opening in a closed position and are movable to an open position in which the first panel is positioned adjacent to an exterior surface of the front window, the second panel is positioned adjacent to the exterior surface of the front window, the third panel is positioned adjacent to an exterior surface of the rear window, and the fourth panel is positioned adjacent to the exterior surface of the rear window.

13. The vehicle of claim 12, wherein the first panel and the second panel are in a stacked configuration with respect to each other in the open position, and the third panel and the fourth panel are in a stacked configuration with respect to each other in the open position.

14. The vehicle of claim 12, wherein the first panel and the second panel are located near a lower end of the front window in the open position and the third panel and the fourth panel are located near a lower end of the rear window in the open position.

15. The vehicle of claim 12, wherein the first panel is positioned rearward from the front window in the closed position, the second panel is positioned rearward from the first panel in the closed position, and the second panel is positioned forward from the rear window in the closed position.

16. The vehicle of claim 12, wherein the first panel, the second panel, the third panel, and the fourth panel move along an exterior of the vehicle between the closed position and the open position.

17. The vehicle of claim 12, wherein at least part of the first panel is at least translucent, at least part of the second panel is at least translucent, at least part of the third panel is at least translucent, and at least part of the fourth panel is at least translucent.

18. The vehicle of claim 1, further comprising longitudinal rails, and the roof opening is defined between the longitudinal rails such that the rigid first panel and the rigid second panel extend between the longitudinal rails in the closed position.

19. The vehicle of claim 7, wherein the opening is a roof opening.

20. The vehicle of claim 7, further comprising longitudinal rails, and the opening is defined between the longitudinal rails such that the rigid panel extends between the longitudinal rails in the closed position.

21. The vehicle of claim 12, further comprising front pillars, wherein the front window extends between the front pillars in a transverse direction and the first panel and the second panel are located near lower ends of the front pillars in the open position.

22. The vehicle of claim 21, further comprising rear pillars, wherein the rear window extends between the rear pillars in the transverse direction and the third panel and the fourth panel are located near lower ends of the rear pillars in the open position.

* * * * *